(12) United States Patent
Tajima et al.

(10) Patent No.: US 8,927,633 B2
(45) Date of Patent: Jan. 6, 2015

(54) AROMATIC POLYCARBONATE RESIN COMPOSITION, AND MOLDED ARTICLE COMPRISING SAME

(75) Inventors: Jun Tajima, Ibaraki (JP); Yutaka Nishibayashi, Kanagawa (JP); Hiromitsu Nagashima, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/342,146

(22) PCT Filed: Aug. 31, 2012

(86) PCT No.: PCT/JP2012/072136
§ 371 (c)(1),
(2), (4) Date: Feb. 28, 2014

(87) PCT Pub. No.: WO2013/031941
PCT Pub. Date: Mar. 7, 2013

(65) Prior Publication Data
US 2014/0221541 A1     Aug. 7, 2014

(30) Foreign Application Priority Data

Sep. 2, 2011 (JP) ................................. 2011-191215
Sep. 2, 2011 (JP) ................................. 2011-191216

(51) Int. Cl.
*C08K 5/42* (2006.01)
*C08K 5/549* (2006.01)

(52) U.S. Cl.
USPC .......................................... 524/166; 524/165

(58) Field of Classification Search
USPC ................................. 524/165, 166
See application file for complete search history.

(56) References Cited

U.S. PATENT DOCUMENTS

| 5,045,582 | A | 9/1991 | Hashimoto et al. |
| 5,352,747 | A | 10/1994 | Ohtsuka et al. |
| 6,773,787 | B2 | 8/2004 | Maas et al. |

FOREIGN PATENT DOCUMENTS

| JP | 01-217039 | 8/1989 | |
| JP | 2-251561 | 10/1990 | |
| JP | 03-143950 | 6/1991 | |
| JP | 05-257002 | 10/1993 | |
| JP | 8-109323 | 4/1996 | |
| JP | 9-59505 | 3/1997 | |
| JP | 10-152610 | 6/1998 | |
| JP | 10-298421 | 11/1998 | |
| JP | 11-323118 | 11/1999 | |
| JP | 2000-169695 | 6/2000 | |
| JP | 3263795 | 12/2001 | |
| JP | 2004-029091 | 1/2004 | |
| JP | 4220829 | 11/2008 | |
| JP | 2008-297424 | 12/2008 | |
| JP | 2010-065164 | * 3/2010 | ............. C08L 69/00 |
| JP | 2011-57786 | 3/2011 | |
| JP | 2011-157536 | 8/2011 | |
| WO | 2011/132510 | 10/2011 | |

OTHER PUBLICATIONS

International Search Report issued Nov. 20, 2012 in PCT/JP2012/072136.

* cited by examiner

*Primary Examiner* — John Uselding
(74) *Attorney, Agent, or Firm* — Greenblum & Bernstein, P.L.C.

(57) ABSTRACT

An aromatic polycarbonate resin composition includes per 100 mass parts of an aromatic polycarbonate resin (A) having an aromatic polycarbonate resin (a1) and an aromatic polycarbonate resin (a2) in a ratio when a total quantity of aromatic polycarbonate resins (a1) and (a2) is denoted as 100 mass percent, (a1):(a2)=99 mass percent to 50 mass percent:1 mass percent to 50 mass percent; 0.01 to 10 mass parts of microparticles (B) selected from the group consisting of polyorganosilsesquioxane microparticles and (meth)acrylic resin microparticles; and 0.005 mass part to 0.1 mass part of a flame retardant (C) in the form of organic sulfonic acid metal salt; wherein a molten resin quantity Q value flowing out of an orifice 1 mm in diameter×10 mm in length at a temperature of 280° C. at a load of $1.57 \times 10^7$ Pa.

13 Claims, No Drawings

AROMATIC POLYCARBONATE RESIN COMPOSITION, AND MOLDED ARTICLE COMPRISING SAME

CROSS-REFERENCE TO RELATED APPLICATIONS

This application claims the benefit of priority to Japanese Patent Application No. 2011-191215 and Japanese Patent Application No. 2011-191216 filed on Sep. 2, 2011, which are expressly incorporated herein by reference in their entirety.

TECHNICAL FIELD

The present invention relates to an aromatic polycarbonate resin composition and to a molded article comprised of the same. More particularly, the present invention relates to an aromatic polycarbonate resin composition with enhanced flame retardance and improved thermal resistance without loss of the excellent mechanical characteristics of aromatic polycarbonate resins, and to an aromatic polycarbonate resin molded article obtained by molding this aromatic polycarbonate resin composition.

BACKGROUND ART

Polycarbonate resins have a wide range of applications as thermoplastic resins with good impact resistance, thermal resistance, flame retardance, and transparence. They are lighter and more readily processed than inorganic glass. Thus, by imparting a light-diffusing property, they can be suitably employed in applications requiring light diffusion, such as lighting covers, illuminated signs, light-passing screens, various displays, and the light-diffusing sheets and the like of liquid-crystal display devices.

Conventionally, the methods of adding inorganic compounds such as glass, silica, and aluminum hydroxide have been proposed as methods of imparting light-diffusing property to polycarbonate resins. However, when these inorganic compounds are added, there are drawbacks in that thermal stability decreases during molding processing, extrusion processing, and the like, and mechanical strength decreases.

For example, Patent Document 1 discloses a light-diffusing polycarbonate resin to which polymethyl methacrylate microparticles with a mass average particle diameter ranging from 0.5 to 100 μm and a difference in refractive index with the polycarbonate resin of equal to or more than 0.01 are added as a light-diffusing polycarbonate resin in which improvement has been made with regard to such drawbacks. However, this polycarbonate resin affords an inadequate light-diffusing property and poor practical utility.

The addition of polyorganosiloxane particles instead of acrylic resin has also been proposed. For example, Patent Documents 2 and 3 propose polycarbonate resins into which polyalkyl silsesquioxane particles are blended.

The blending in of polyalkyl silsesquioxane particles as proposed in Patent Documents 2 and 3 can enhance transmittance and the light-diffusing property, achieving a certain diffusing effect.

However, the specifications that have been required of light-diffusing polycarbonate resin compositions for optical applications have grown ever more stringent in recent years. Further, a variety of specifications are required for individual applications. Thus, the requirements of various fields cannot be fully satisfied by simply adding polyorganosiloxane particles in this manner. Specifically, there is a need for polycarbonate resin compositions with an overall balance of transmittance, diffusion rate, and degree of dispersion.

A polycarbonate resin composition in which polyorganosiloxane particles of specific average particle diameter and of specific particle size distribution are blended into a polycarbonate resin in a specific ratio to obtain a polycarbonate resin composition with good total light transmittance and light-diffusing property has been proposed (Patent Document 4). The polycarbonate resin composition disclosed in Patent Document 4 has good mechanical characteristics such as impact resistance, as well as good total light transmittance and light-diffusing property. However, it has a drawback in the form of poor thermal resistance, as well as inadequate flame retardance.

Patent Document 5 discloses a high-transmittance light-dispersing plate made of polycarbonate resin with a total light transmittance of equal to or greater than 85% and a diffuse transmittance of 10 to 30% in which microparticles 50 μm or less in diameter and having an average particle diameter of 5 to 20 μm are blended. However, this plate affords a low light-diffusing property and is of poor practical utility.

Patent Document 6 discloses a polycarbonate resin composition to which has been added calcium carbonate, titanium oxide, and polyorganohydrogensiloxane as a resin composition with good light transmittance and light-diffusing property. However, this composition is unsatisfactory in terms of thermal stability and impact resistance and does not afford adequate total light transmittance.

Patent Document 7 discloses a directly backlit light-diffusing plate made of polycarbonate resin comprised of a composition into which transparent microparticles with an average particle diameter of 1 to 30 μm and a fluorescent brightening agent have been blended. However, this plate enhances brightness through the use of a fluorescent brightening agent. Thus, thermal stability is inadequate, coloration occurs during molding and extrusion, and discoloration tends to occur during recycling. It is thus of little practical utility.

Patent Document 8 discloses a polycarbonate resin composition affording good total light transmittance, good light-diffusing property, and good moldability without loss of mechanical properties, such as the inherent impact resistance of polycarbonate resins, in the form of a polycarbonate resin composition into which are blended in a specific ratio acrylic resin microparticles of specific average particle diameter and specific particle diameter distribution. However, this composition presents the drawback of poor thermal resistance and inadequate flame retardance.

Patent Documents 9 to 11 and the like disclose flame retardant polycarbonate resin compositions comprised of two types of polycarbonate resin—a high molecular weight and a low molecular weight polycarbonate resin—and a flame retardant. However, the flame retardant polycarbonate resin compositions that are disclosed in these Patent Documents contain polycarbonates with a viscosity average molecular weight of equal to or greater than 100,000 and blended in flame retardant quantities of 0.1 weight part or more. They also present problems in the form of the flame retardance and transparence of molded articles.

[Patent Document 1] Japanese Unexamined Patent Publication (KOKAI) Heisei No. 03-143950

[Patent Document 2] Japanese Patent No. 3,263,795

[Patent Document 3] Japanese Patent No. 4,220,829

[Patent Document 4] Japanese Unexamined Patent Publication (KOKAI) No. 2011-57786

[Patent Document 5] Japanese Unexamined Patent Publication (KOKAI) Heisei No. 05-257002

[Patent Document 6] Japanese Unexamined Patent Publication (KOKAI) 2000-169695

[Patent Document 7] Japanese Unexamined Patent Publication (KOKAI) No. 2004-029091

[Patent Document 8] Japanese Unexamined Patent Publication (KOKAI) No. 2011-157536

[Patent Document 9] Japanese Unexamined Patent Publication (KOKAI) Heisei No. 2-251561

[Patent Document 10] Japanese Unexamined Patent Publication (KOKAI) Heisei No. 9-59505

[Patent Document 11] Japanese Unexamined Patent Publication (KOKAI) Heisei No. 11-323118

SUMMARY OF THE INVENTION

As set forth above, background art has yet to provide an aromatic polycarbonate resin that affords good total light transmittance and light diffusion and that exhibits flame retardance and thermal resistance that are satisfactory for applications such as lighting covers and various light-diffusing plates.

An aspect of the present invention provides for an aromatic polycarbonate resin composition that enhances the flame retardance and thermal resistance of a polycarbonate resin composition; affords good mechanical characteristics, total light transmittance, and light-diffusing properties; and has good moldability; as well as an aromatic polycarbonate resin molded article obtained by molding this aromatic polycarbonate resin composition.

The present inventors conducted extensive research. As a result, they discovered that by blending microparticles (B) selected from the group consisting of polyorganosilsesquioxane microparticles and (meth)acrylic resin microparticles into a transparent aromatic polycarbonate resin (A) comprising an aromatic polycarbonate resin (a1) with a viscosity average molecular weight of $3 \times 10^3$ to $2.5 \times 10^4$ and an aromatic polycarbonate resin (a2) with a viscosity average molecular weight of $5 \times 10^4$ to $9 \times 10^4$, it was possible to obtain a good aromatic polycarbonate resin composition with further enhanced flame retardance and thermal resistance without losing the enhancing effect on total light transmittance and the light-diffusing property. In particular, blending in the above microparticles of specific average particle diameter and specific particle diameter distribution could yield an aromatic polycarbonate resin material affording a balance between good total light transmittance and light-diffusing property.

An aspect of the present invention relates to:

an aromatic polycarbonate resin composition, which comprises:

per 100 mass parts of an aromatic polycarbonate resin (A) comprising an aromatic polycarbonate resin (a1) with a viscosity average molecular weight of $3 \times 10^3$ to $2.5 \times 10^4$ and an aromatic polycarbonate resin (a2) with a viscosity average molecular weight of $5 \times 10^4$ to $9 \times 10^4$ in a ratio such that, when a total quantity of aromatic polycarbonate resins (a1) and (a2) is denoted as 100 mass percent, (a1):(a2)=99 mass percent to 50 mass percent:1 mass percent to 50 mass percent;

0.01 to 10 mass parts of microparticles (B) selected from the group consisting of polyorganosilsesquioxane microparticles and (meth)acrylic resin microparticles; and 0.005 mass part to 0.1 mass part of a flame retardant (C) in the form of organic sulfonic acid metal salt;

wherein a molten resin quantity Q value flowing out of an orifice 1 mm in diameter×10 mm in length at a temperature of 280° C. at a load of $1.57 \times 10^7$ Pa using a constant-load orifice-type flow tester is equal to or greater than 0.01 cm$^3$/second and equal to or lower than 0.1 cm$^3$/second.

In an embodiment, the viscosity average molecular weight of aromatic polycarbonate resin (a2) is $5 \times 10^4$ to $8 \times 10^4$.

In an embodiment, the aromatic polycarbonate resin composition comprises 0.01 to 5 mass parts of polyorganosilsesquioxane microparticles per 100 mass parts of aromatic polycarbonate resin (A).

In an embodiment, microparticles (B) are polyorganosilsesquioxane microparticles the average particle diameter of which as measured over a range of 0.4 to 12 µm by the Coulter counter method is 1 to 3 µm, with the highest peak and second highest peak in the particle diameter distribution both lying within a range of 1 to 3 µm.

In an embodiment, microparticles (B) are polyorganosilsesquioxane microparticles with a number based frequency (%) of 0.1 to 8% over the range of 0.5 to 1 µm when measuring the number based frequency (%) over a diameter range of 0.4 to 12 µm by the Coulter counter method, and with a volume based frequency (%) of 0.05 to 2.5% over the range of 4 to 11 µm.

In an embodiment, microparticles (B) are polyorganosilsesquioxane microparticles in the form of polymethylsilsesquioxane microparticles.

In an embodiment, the aromatic polycarbonate resin composition comprises 0.1 to 10 mass parts of (meth)acrylic resin microparticles per 100 mass parts of aromatic polycarbonate resin (A).

In an embodiment, microparticles (B) are (meth)acrylic resin microparticles the particle diameter of which as measured on a number basis over the diameter range of 0.4 to 12 µm by the Coulter counter method satisfies conditions (i) to (iii) below:

(i) an average particle diameter of 1 to 4 µm;

(ii) a ratio of particles with a particle diameter of equal to or greater than 1 µm but less than 2 µm, a ratio of particles with a particle diameter of equal to or greater than 2 µm but less than 3 µm, and a ratio of particles with a particle diameter of equal to or greater than 3 µm each falling within a range of 20 to 40%; and (iii) essentially not containing particles with a particle diameter of equal to or greater than 10 µm.

In an embodiment, microparticles (B) are (meth)acrylic resin microparticles in the form of copolymer microparticles comprising 90 to 99 mass percent of a noncrosslinking (meth)acryl monomer (b1) and 10 to 1 mass percent of a crosslinking monomer (b2).

In an embodiment, microparticles (B) are (meth)acrylic resin microparticles in the form of polymethyl methacrylate microparticles.

In an embodiment, the aromatic polycarbonate resin composition further comprises 0.05 to 1 mass part of an ultraviolet absorbent (D) per 100 mass parts of transparent aromatic polycarbonate resin (A).

A further aspect of the present invention relates to an aromatic polycarbonate resin molded article obtained by molding the above aromatic polycarbonate resin composition.

In an embodiment, the molded article is a lighting cover or a light-diffusing plate.

By blending in microparticles (B), the aromatic polycarbonate resin composition of the present invention can improve the total light transmittance and light-diffusing property without losing the mechanical or physical properties of an aromatic polycarbonate resin. That is, since aromatic polycarbonate resin (A)—obtained by mixing aromatic polycarbonate resins (a1) and (a2) of mutually differing viscosity average molecular weights in a ratio of specific ranges—can afford good transparence, the enhancing effect on total light transmittance and light-diffusing property and the enhancing effect on the degree of dispersion that are achieved by blending in microparticles (B) are not compromised. The incorporation of a flame retardant in the form of a specific quantity of an organic sulfonic acid alkali metal salt (C) can achieve good flame retardance. Thus, the present invention can provide an aromatic polycarbonate resin composition with good total light transmittance, light-diffusing property, and moldability, a high degree of flame retardance, and good thermal resistance; as well as a molded article.

In particular, the blending in of microparticles (B) having a specific average particle diameter and a specific particle diameter distribution can yield an aromatic polycarbonate resin material achieving a balance between good total light transmittance and light-diffusing property.

MODES FOR CARRYING OUT THE INVENTION

The present invention will be described in detail below through embodiments, examples and the like. However, the present invention is not limited by the embodiments, examples, and the like given below. The present invention can be implemented by any modification that remains within the scope and spirit thereof.

1. Aromatic Polycarbonate Resin Composition

The present invention relates to an aromatic polycarbonate resin composition comprising, at least, aromatic polycarbonate resins (a1) and (a2) with molecular weights falling within specific ranges; microparticles (B) selected from the group consisting of polyorganosilsesquioxane microparticles and (meth)acrylic resin microparticles; and a sulfonic acid alkali metal salt (C) in a ratio of specific ranges. The aromatic polycarbonate resin composition of the present invention can contain other components as needed.

Based on the present invention, the blending in of microparticles (B) can enhance the total light transmittance and light-diffusing properties. The use of aromatic polycarbonate resin (A), comprising aromatic polycarbonate resins (a1) and (a2) with molecular weights falling within specified ranges, as a resin component makes it possible to form a resin matrix with good transparence, flame retardance, and thermal resistance. Thus, it is possible to provide an aromatic polycarbonate resin composition, and a molded article, with good flame retardance and thermal resistance can be provided without compromising the enhancing effect of total light transmittance and the light-diffusing property achieved by the blending in of microparticles (B).

[Aromatic Polycarbonate Resin (A)]

The aromatic polycarbonate resin composition of the present invention comprises an aromatic polycarbonate resin (A) comprising an aromatic polycarbonate resin (a1) with a viscosity average molecular weight of $3\times10^3$ to $2.5\times10^4$ and an aromatic polycarbonate resin (a2) with a viscosity average molecular weight of $5\times10^4$ to $9\times10^4$ in a ratio (a1):(a2)=99 mass percent to 50 mass percent:1 mass percent to 50 mass percent.

The molecular weights of aromatic polycarbonate resins (a1) and (a2) are limited to the above ranges. They are not specifically limited in terms of starting monomers, manufacturing method, structure, or the like. They can be a combination of resins of a single type of aromatic polycarbonate resin manufactured by the same method using the same starting monomer and mutually differing only in molecular weight, or a combination of resins of mutually differing starting monomers or the like, and having molecular weights falling in the above-stated ranges. Aromatic polycarbonate resins (a1) and (a2) can each be a mixture of two or more aromatic polycarbonate resins with molecular weights falling within the above-stated ranges.

Aromatic polycarbonate resin (A) comprises an aromatic polycarbonate resin (a1) with a viscosity average molecular weight of $3\times10^3$ to $2.5\times10^4$ and an aromatic polycarbonate resin (a2) with a viscosity average molecular weight of $5\times10^4$ to $9\times10^4$ in a ratio such that, when the total quantity of aromatic polycarbonate resins (a1) and (a2) is denoted as 100 mass percent, (a1):(a2)=99 mass percent to 50 mass percent:1 mass percent to 50 mass percent. That is, when the mass percentage of aromatic polycarbonate resin (a1) is denoted as $\alpha$, the mass percentage $\beta$ of aromatic polycarbonate resin (a2) is given by (100-$\alpha$). The value of $\alpha$, as set forth above, is $50 \leq \alpha \leq 99$, desirably $55 \leq \alpha \leq 95$, and preferably $60 \leq \alpha \leq 90$. In the present invention, a larger quantity of aromatic polycarbonate resin (a1) than of aromatic polycarbonate resin (a2) is desirably contained.

The viscosity average molecular weight (Mv) of aromatic polycarbonate resin (a1) is desirably $4\times10^3$ to $2.5\times10^4$, preferably $4.5\times10^3$ to $2.5\times10^4$. Aromatic polycarbonate resin (a1) can be selected from among commercially available products. Specifically lupilon H-4000, H-7000, H-3000, S-3000, AL-071, NovaRex 7020R and 7022R (all of which are made by Mitsubishi Engineering Plastics Corp.); Lexan 121, 124, and 141 (made by Sabic Innovative Plastics Corp.); Panlite L-1225L, L-1225Y, L-1225LM, L-1225WX, L-1225WS, and L-1225WP (made by Teijin Chemicals, Inc.); and Tarflon A1700, A1900, and A2200 (made by Idemitsu Chemicals) can be employed as aromatic polycarbonate resin (a1).

The viscosity average molecular weight (Mv) of aromatic polycarbonate resin (a2) ranges from $5\times10^4$ to $9\times10^4$. The upper limit of the viscosity average molecular weight is desirably equal to or less than $8.5\times10^4$, preferably equal to or less than $8\times10^4$, and more preferably, equal to or less than $7\times10^4$. The lower limit of the viscosity average molecular weight is, as set forth above, equal to or greater than $5\times10^4$, preferably equal to or greater than $5.5\times10^4$. For example, the viscosity average molecular weight (Mv) of aromatic polycarbonate resin (a2) can fall within the range of $5\times10^4$ to $8\times10^4$. It can also fall within the range of $5\times10^4$ to $7\times10^4$.

Aromatic polycarbonate resin (a2) can be selected from among copolymer polycarbonate resins comprised of 2,2-bis (4-hydroxyphenyl)propane [=bisphenol A] and the compound denoted by formula [1] below. In particular, it can be selected from among copolymer polycarbonate resins comprised of 99.9 mass percent to 90 mass percent of bisphenol A and 0.1 mass percent to 10 mass percent of the compound denoted by formula [1] below:

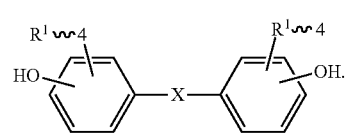

[1]

In formula [1], each of $R^1$ to $R^4$ denotes a hydrogen atom, fluorine atom, chlorine atom, bromine atom, or iodine atom; an alkyl group having 1 to 9 carbon atoms, alkoxy group having 1 to 5 carbon atoms, aryl group having 6 to 12 carbon atoms, alkenyl group having 2 to 5 carbon atoms, or aralkyl group having 7 to 17 carbon atoms, each of which can be substituted or unsubstituted, where the substituents optionally present for any of the carbon atoms in these groups are alkyl groups with 1 to 5 carbon atoms, alkenyl groups with 2 to 5 carbon atoms, or alkoxy groups with 1 to 5 carbon atoms.

Further X denotes:

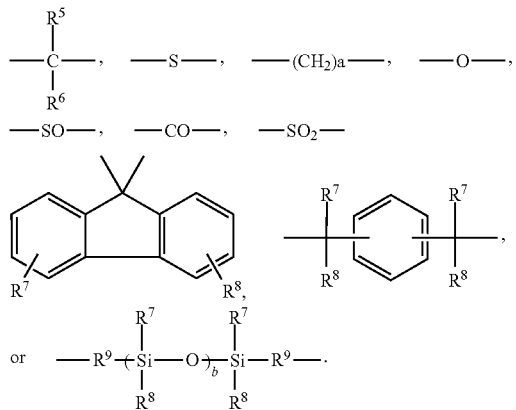

In the above, each of $R^5$ and $R^6$ denotes a hydrogen atom, fluorine atom, chlorine atom, bromine atom, or iodine atom; an alkyl group having 1 to 9 carbon atoms, alkoxy group having 1 to 5 carbon atoms, aryl group having 6 to 12 carbon atoms, alkenyl group having 2 to 5 carbon atoms, or aralkyl group having 7 to 17 carbon atoms, each of which can be substituted or unsubstituted; or $R^5$ or $R^6$ are mutually bonded to form a carbon ring or hetero ring; where the substituents optionally present for any of the carbon atoms in these groups are alkyl groups with 1 to 5 carbon atoms, alkoxy groups with 1 to 5 carbon atoms, alkenyl groups with 2 to 5 carbon atoms, fluorine atoms, chlorine atoms, bromine atoms, or iodine atoms. Each of $R^7$ and $R^8$ denotes a hydrogen atom, fluorine atom, chlorine atom, bromine atom, or iodine atom; alkyl group having 1 to 9 carbon atoms, alkoxy group having 1 to 5 carbon atoms, or aryl group having 6 to 12 carbon atoms, each of which can be substituted or unsubstituted; where the substituents optionally present for any of the carbon atoms in these groups are alkyl groups with 1 to 5 carbon atoms, alkoxy groups with 1 to 5 carbon atoms, fluorine atoms, chlorine atoms, bromine atoms, or iodine atoms. $R^9$ denotes a substituted or unsubstituted alkylene group with 1 to 9 carbon atoms; a denotes an integer of 0 to 20; and b denotes an integer of 1 to 500.

Specific examples of components denoted by formula [1] above are: 1,1'-biphenyl-4,4'-diol, bis(4-hydroxyphenyl) methane, 1,1-bis(4-hydroxyphenyl)methane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxy-3-tert-butylphenyl)propane, 2,2-bisbis(4-hydroxy-3-methylphenyl)propane [=bisphenol C], 1,1-bis(4-hydroxyphenyl)cyclopentane, 1,1-bis(4-hydroxyphenyl)cyclohexane [=bisphenol Z], 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, and 4,4'-[1,3-phenylenebis(1-methylethylidene)]bisphenol. Of these, bis(4-hydroxyphenyl)ether, 2,2-bis(4-hydroxy-3-methylphenyl) propane [=bisphenol C], 1,1-bis(4-hydroxyphenyl) cyclohexane [=bisphenol Z], and 1,1-bis(4-hydroxyphenyl)-1-phenylethane are desirable and 1,1-bis(4-hydroxyphenyl) cyclohexane [=bisphenol Z] are preferred.

Aromatic polycarbonate resins (a1) and (a2) can each be synthesized by a variety of methods. For example, they can be manufactured by various synthesis methods such as interfacial polymerization, the pyridine method, transesterification, and ring-opening polymerization of a cyclic carbonate compound. Specifically, they can be in the form of linear or branched thermoplastic aromatic polycarbonate polymers or copolymers obtained by reacting an aromatic dihydroxy compound, or such a compound and a small quantity of a polyhydroxy compound, with a carbonyl chloride generally known as a phosgene, or with a carbonic acid diester typified by dimethyl carbonate or diphenyl carbonate, or a carbonyl compound such as carbon monoxide or carbon dioxide.

Examples of starting material aromatic dihydroxy compounds are 1,1'-biphenyl-4,4'-diol, bis(4-hydroxyphenyl) methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane [=bisphenol A], 2,2-bis(4-hydroxy-3-tert-butylphenyl)propane, 2,2-bis(4-hydroxy-3-methylphenyl)propane [=bisphenol C], 1,1-bis(4-hydroxyphenyl)cyclopentane, 1,1-bis(4-hydroxyphenyl)cyclohexane [=bisphenol Z], 2,2-bis(4-hydroxyphenyl)hexafluoropropane, bis(4-hydroxyphenyl) diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, and 4,4'-[1,3-phenylenebis(1-methylethylidene)]bisphenol. Desirable examples are bis(4-hydroxyphenyl)alkanes. Preferred examples are 2,2-bis(4-hydroxyphenyl)propane [bisphenol A] and 1,1-bis(4-hydroxyphenyl)cyclohexane [bisphenol Z]. These aromatic dihydroxy compounds can be employed singly or in mixtures of two or more. A compound obtained by bonding one or more tetraalkyl phosphonium sulfonates to the above aromatic dihydroxy compound, or a polymer, oligomer, or the like containing phenolic OH groups on both ends and having a siloxane structure, can be employed in combination as part of the above dihydroxy compound.

Phloroglucin, 4,6-dimethyl-2,4,6-tris(4-hydroxyphenyl) heptene-2,4,6-dimethyl-2,4,6-tris(4-hydroxyphenyl)heptane, 2,6-dimethyl-2,4,6-tris(4-hydroxyphenyl)heptene-3,1, 3,5-tris(4-hydroxyphenyl)benzene, 1,1,1-tris(4-hydroxyphenyl)ethane, and other polyhydroxy compounds; 3,3-bis(4-hydroxyaryl)oxyindole (=isatin-bisphenol), 5-chlorisatin bisphenol, 5,7-dichlorisatin bisphenol, and 5-bromisatin bisphenol can be employed as part of the above aromatic dihydroxy compound to obtain a branched polycarbonate resin. The quantity employed can be, for example, 0.01 to 10 mole percent, desirably 0.1 to 3 mole percent.

In a reaction by the interfacial polymerization method, in the presence of an organic solvent or alkali aqueous solution that is inert to the reaction, normally while maintaining the pH at equal to or higher than 10, the above aromatic hydroxy compound, a molecular weight-adjusting agent (terminating agent), and, as needed, an oxidation-inhibitor for preventing oxidation of the aromatic dihydroxy compound are reacted with phosgene. Subsequently, a polymerization catalyst such as a tertiary amine or quaternary ammonium salt is added and interfacial polymerization is conducted to obtain a polycarbonate resin. So long as the molecular weight-adjusting agent is added during the period from the phosgene treatment to the start of the polymerization reaction, the addition thereof is not specifically limited. The reaction temperature is 0 to 35° C. and the reaction time is from several minutes to several hours.

Examples of organic solvents that are inert to the reaction are chlorinated hydrocarbons such as dichloromethane, 1,2-dichoroethane, chloroform, monochlorobenzene, and dichlorobenzene; and aromatic hydrocarbons such as benzene, toluene, and xylene. An example of the molecular weight-adjusting agent or terminating agent is a compound having a monohydric phenolic hydroxyl group. Specific examples are m-methylphenol, p-methylphenol, m-propylphenol, p-propylphenol, p-tert-butylphenol, and p-long-chain alkyl-substituted phenols. Examples of polymerization catalysts are trimethylamine, triethylamine, tributylamine, tripropylamine, trihexylamine, pyridine, and other tertiary amines; and trimethylbenzyl ammonium chloride, tetramethyl ammonium chloride, triethylbenzyl ammonium chloride, and other quaternary ammonium salts.

The reaction based on a transesterification reaction is between a carbonic diester and an aromatic dihydroxy compound. Normally, the mixing ratio of the carbonic diester and the aromatic dihydroxy compound is adjusted and the reduction in pressure during the reaction is controlled to yield the molecular weight and number of terminal hydroxyl groups of the desired polycarbonate resin. The number of terminal hydroxyl groups greatly affects the thermal stability, hydrolysis stability, color, and the like of the polycarbonate resin. To obtain a compound with practical physical properties, it is desirably kept to equal to or less than 1,000 ppm, preferably equal to or less than 700 ppm. For each mol of aromatic hydroxy compound, an equal or greater number of mols of carbonic diester is generally employed. Desirably, 1.01 to 1.30 mols are employed.

In the course of synthesizing a polycarbonate resin by means of a transesterification reaction, a transesterification catalyst is generally employed. The transesterification catalyst is not specifically limited. Alkali metal compounds and/or alkaline earth metal compounds are principally employed. It is also possible to employ a basic compound such as a basic boron compound, basic phosphorus compound, basic ammonium compound, or an amine compound in combination in supplemental fashion. For example, a transesterification reaction employing such starting materials is generally conducted at a reaction temperature of 100 to 320° C. and at a final reduced pressure of $2.7 \times 10^2$ Pa (2 mmHg) or less. While removing by-products such as aromatic hydroxy compounds, a melt polycondensation reaction is conducted. The melt polycondensation can be of the batch type or can be conducted continuously. From the perspective of stability and the like, it is desirably conducted continuously. In transesterification, a compound that neutralizes the catalyst, such as an sulfur-containing acidic compound, or a derivative formed from such a compound, is desirably employed to deactivate the catalyst in the polycarbonate resin. The quantity added is 0.5 to 10 equivalents per the alkali metal of the catalyst, desirably falling within a range of 1 to 5 equivalents, and usually ranges from 1 to 100 ppm, desirably 1 to 20 ppm, relative to the polycarbonate resin.

For example, polycarbonate resin composition flakes can be obtained by adding a methylene chloride solution containing a polycarbonate resin composition obtained by the interfacial polymerization method dropwise to warm water maintained at 45° C. and evaporating off the solvent; by introducing into methanol a methylene chloride solution containing a polycarbonate resin composition obtained by the interfacial polymerization method and filtering out and drying the precipitating polymer; or by stirring in a kneader a methylene chloride solution containing a polycarbonate resin composition obtained by the interfacial polymerization method, conducting stirring pulverization while maintaining 40° C., and removing the solvent with hot water of equal to or higher than 95° C.

Aromatic polycarbonate resin (A) can consist of aromatic polycarbonate resins (a1) and (a2). To the extent the object of the present invention is not compromised, the aromatic polycarbonate resin composition of the present invention can contain other resin components in addition to aromatic polycarbonate resin (A). Examples of other transparent resin components that can be blended in are polystyrene resins, high-impact polystyrene resins, hydrogenated polystyrene resins, polyacrylic styrene resins, ABS resins, AS resins, AES resins, ASA resins, SMA resins, polyalkyl methacrylate resins, polymethacrylic methacrylate resins, polyphenyl ether resins, polycarbonate resins other than the component (A), amorphous polyalkylene terephthalate resins, polyester resins, amorphous polyamide resins, poly-4-methylpentene-1, cyclic polyolefin resins, amorphous polyarylate resins, polyethersulfones, styrene thermoplastic elastomers, olefin thermoplastic elastomers, polyamide thermoplastic elastomers, polyester thermoplastic elastomers, polyurethane thermoplastic elastomers, and other thermoplastic elastomers. Desirable examples are polystyrene resins, ABS resins, AS resins, AES resins, ASA resins, polyphenylene ether resins, polymethacrylic methacrylate resins, and polyester resins.

These can be employed singly or in mixtures of two or more. The effect of the present invention can be achieved by employing aromatic polycarbonate resins (a1) and (a2) having specified molecular weights in a specific ratio. Thus, these additional transparent resin components are desirably employed in proportions of equal to or fewer than 20 mass parts, preferably equal to or fewer than 10 mass parts, more preferably equal to or fewer than 5 mass parts, and can be 0 mass part, per 100 mass parts of aromatic polycarbonate resin (A).

The aromatic polycarbonate resin composition of the present invention contains microparticles (B) selected from among polyorganosilsesquioxane microparticles and (meth)acrylic resin microparticles. Microparticles (B) are a component that can contribute to enhancing the light-diffusing property.

One or more types of polyorganosilsesquioxane microparticles, or one or more types of (meth)acrylic resin microparticles, can be employed as microparticles (B). Polyorganosilsesquioxane microparticles and (meth)acrylic resin microparticles can also be employed in combination.

Microparticles (B) will be described in greater detail below.

[Polyorganosilsesquioxane Microparticles]

An embodiment of microparticles (B) is polyorganosilsesquioxane microparticles. In the present invention, the term "polyorganosilsesquioxane microparticles" refers to microparticles comprised of polyorganosiloxane having a principal component in the form of a trifunctional siloxane unit (also referred to hereinafter as a "T unit") denoted by $RSiO_{1.5}$ (R denoting a monovalent organic group). Of the total of 100 mole percent of the siloxane units, T units account for equal to or more than 50 mole percent. The proportion of T units is preferably equal to or greater than 80 mole percent, more preferably equal to or greater than 90 mole percent, still more preferably equal to or greater than 95 mole percent, and optimally, 100 mole percent. The polyorganosilsesquioxane microparticles are desirable for their high thermal resistance and the ease with which suitable particle diameters can be obtained.

The polyorganosilsesquioxane microparticles employed in the present invention can also contain monofunctional siloxane units (also referred to as "M units" hereinafter) denoted by $R_3SiO_{0.5}$ (R being a monovalent organic group) in addition to the above T units. Employing polyorganosilsesquioxane microparticles containing M units affords the merits of enhancing the thermal resistance of the microparticles themselves, affording an aromatic polycarbonate resin composition of the present invention of more desirable color, enhancing dispersion in the resin components of the present invention, and facilitating the obtaining of an aromatic polycarbonate resin composition affording uniform optical performance.

The above polyorganosiloxane can also comprise a bifunctional siloxane unit denoted by $R_2SiO_{2.0}$ (R denoting a monovalent organic group).

Desirable examples of organic group R in the polyorganosilsesquioxane are: a methyl group, ethyl group, propyl group, butyl group, hexyl group, decyl group, dodecyl group, octadecyl group, and other alkyl groups with 1 to 20 carbon atoms; a cyclic alkyl group such as a cyclohexyl group; an aryl group such as a phenyl group, tolyl group, or xylyl group; and an aralkyl group such as a phenylethyl group or phenylpropyl group. Of these, polyalkylsilsesquioxanes in which R denotes an alkyl group with 1 to 20 carbon atoms are desirable because they afford a large difference in refractive index with the resin matrix constituted by aromatic polycarbonate resin component (A), tend to enhance the diffusing effect, and tend to improve thermal resistance. Polymethylsilsesquioxanes are preferred.

In the present invention, the polyorganosilsesquioxane microparticles are desirably polyorganosilsesquioxane microparticles of specific average particle diameter and specific particle diameter distribution, having an average particle diameter of 1 to 3 µm as measured over a range of 0.4 to 12 µm by the Coulter counter method, with the highest peak and second highest peak in the particle diameter distribution both lying within a range of 1 to 3 µm. When the average particle diameter of the polyorganosilsesquioxane microparticles is less than 1 µm, the light-diffusing property of the aromatic polycarbonate resin composition that is obtained is not enhanced, and the brightness tends to decrease markedly. Conversely, when the average particle diameter exceeds 3 µm, the light-diffusing effect decreases and brightness tends to diminish markedly.

In the present invention, the particle diameter and particle diameter distribution are measured by the Coulter counter method. In the Coulter counter method, sample particles that have been suspended in an electrolyte are passed through fine holes (apertures), at which point the change in the voltage pulse generated in proportion to the volume of the particles is read to quantify the particle diameter. One measurement is processed for each voltage pulse peak, providing a volume distribution histogram of the sample particles. Such particle diameter and particle diameter distribution measurement by the Coulter counter method are the most commonly employed in particle size distribution measurement apparatus.

In the measurement of the particle diameter of polyorganosilsesquioxane microparticles in the present invention, in order to eliminate the effects of extremely small particles and extremely large particles and obtain highly reliable, highly reproducible data, measurement is defined as being conducted over the diameter range of 0.4 to 12 µm.

In the polyorganosilsesquioxane microparticles employed in the present invention, there are multiple (two or more) peaks in the particle diameter distribution. The average particle diameter is 1 to 3 µm, and the highest peak and second highest peak in the particle diameter distribution desirably both lie within the range of 1 to 3 µm. Particularly good improvement in light transmittance and degree of dispersion can be achieved by using particles having an average particle diameter of 1 to 3 µm and a highest peak (also referred to as "$P_1$" hereinafter) and second highest peak (also referred to as "$P_2$" hereinafter) falling within a particle diameter range of 1 to 3 µm.

Polyorganosilsesquioxane microparticles (B) desirably have a number based frequency (%) over the particle diameter range of 0.5 to 1 µm of 0.1 to 8% and desirably have a volume based frequency (%) over the particle diameter range of 4 to 11 µm of 0.05 to 2.5%. By keeping the ratio of particles with a particle diameter of 0.5 to 1 µm within the stated range and by keeping the ratio of particles with a particle diameter of 4 to 11 µm within the stated range, the light-diffusing effect and transmittance are further enhanced and impact resistance tends to improve.

Further, the polyorganosilsesquioxane microparticles employed in the present invention desirably have a ratio ($P_2/P_1$) of the second highest peak ($P_2$) to the highest peak ($P_1$) of 0.2 to 0.95, preferably 0.2 to 0.8. When $P_2/P_1$ is within the above range, the diffusing effect and transmittance can be further enhanced. When $P_2/P_1$ is less than 0.2, the degree of dispersion, a characteristic that is particularly necessary in an illuminated part, tends to decrease. By keeping it to equal to or less than 0.95, the degree of dispersion tends to increase. Incorporating polyorganosilsesquioxane microparticles comprising two or more peaks in suitable proportions in this manner can specifically enhance dispersion in the resin components and effectively enhance diffusion performance.

There are known methods of manufacturing desirable polyorganosilsesquioxane microparticles such as those set forth above. One example, as described in Japanese Unexamined Patent Publication (KOKAI) Heisei No. 01-217039, is the organosilanetriol polycondensation method in which organotrialkoxysilane is hydrolyzed under acidic conditions to obtain a water/alcohol solution of organosilane triol, an alkali aqueous solution is admixed, and the mixture is allowed to stand.

The particle diameter can be primarily adjusted by adjusting the pH of the alkali aqueous solution. The particle diameter can be controlled by raising the pH to obtain small particles and lowering the pH to obtain large particles. The polycondensation reaction is normally conducted for a period ranging from 0.5 to 10 hours following the addition of the alkali aqueous solution, preferably for a period ranging from 0.5 to 5 hours. The condensate cures. During curing, stirring can be conducted gently to prevent association of the particles to permit adjustment of the particle diameter and particle diameter distribution. Further, the polyorganosilsesquioxane microparticles that are obtained can be further pulverized to adjust the particle size. The polyorganosilsesquioxane microparticles can also be obtained with specifications such as the desired particle diameter and distribution specified by the manufacturer.

In the present invention, one type of polyorganosilsesquioxane microparticle can be employed singly or a mixture of two or more types can be employed. For example, two or more types of polyorganosilsesquioxane microparticles obtained from different polyorganosilsesquioxanes can be employed in combination, or two or more polyorganosilsesquioxane microparticles of differing average particle diameter and particle diameter distribution can be employed in combination. In both cases, when employing two or more type of polyorganosilsesquioxane microparticles, the mixture should satisfy the average particle diameter and particle diameter distribution set forth above.

In the aromatic polycarbonate resin composition of the present invention, the content of the polyorganosilsesquioxane microparticles is 0.01 to 10 mass parts, desirably 0.01 to 5 mass parts, preferably 0.1 to 3 mass parts, and more preferably, 0.3 to 2 mass parts, per 100 mass parts of aromatic polycarbonate resin (A). When the proportion of polyorganosilsesquioxane microparticles contained is less than 0.01 mass part, adequate enhancing effects on transmittance and the light-diffusing property cannot be achieved. A proportion of polyorganosilsesquioxane microparticles exceeding 10 mass parts is undesirable in that the transmittance drops and the impact resistance and the like tend to decrease. From the perspective of maintaining transmittance, impact resistance, and the like, the proportion of polyorganosilsesquioxane microparticles contained is desirably equal to or less than 5 mass percent.

[(Meth)Acrylic Resin Microparticles]

Another embodiment of microparticles (B) is (meth) acrylic resin microparticles. The (meth)acrylic resin microparticles employed can be in the form of microparticles of polymers or copolymers obtained using a (meth)acrylic monomer. Examples of (meth)acrylic (co)polymers are methyl methacrylate, methyl acrylate, ethyl acrylate, and cyclohexyl methacrylate polymers, and copolymers containing repeating units derived from these (meth)acrylic monomers.

Copolymer microparticles of a noncrosslinking (meth) acryl monomer (b1) and a crosslinking monomer (b2) are preferred as the (meth)acrylic resin microparticles employed in the present invention. (Meth)acrylic resin microparticles manufactured by suspension polymerization are desirable, and copolymer microparticles of noncrosslinking (meth) acrylic monomer (b1) and crosslinking monomer (b2) manufactured by suspension polymerization are preferred.

Examples of noncrosslinking (meth)acrylic monomer (b1) are methyl acrylate, n-butyl acrylate, ethyl acrylate, propyl acrylate, butyl acrylate, 2-ethylhexyl acrylate, and other acrylic esters; methyl methacrylate, ethyl methacrylate, propyl methacrylate, butyl methacrylate, and other methacrylic esters. These can be employed singly or in combinations of two or more. Of these, methyl methacrylate is suitably employed. That is, (meth)acrylic resin microparticles in the form of polymethyl methacrylate microparticles are desirable.

A compound having two or more unsaturated bonds per molecule is desirably employed as crosslinking monomer (b2). Examples are trimethylolpropane tri(meth)acrylate, allylmethacrylate, triallylcyanurate, triallylisocyanate, ethylene glycol dimethacrylate, propylene glycol diallyl ether, divinylbenzene, diethylene glycol dimethacrylate, and 1,6-hexanediol dimethacrylate. These can be employed singly or in combinations of two or more. Among them, trimethylolpropane tri(meth)acrylate is desirable.

In addition to noncrosslinking (meth)acrylic monomer (b1) and crosslinking monomer (b2), copolymerizable components in the form of monomers capable of copolymerizing with the above monomers can be employed. For example, one or more monomers such as styrenes, α-methyl styrenes, and monomers having vinyl groups such as vinyl acetate can be employed as such monomers.

(Meth)acrylic resin microparticles (B) can be manufactured by suspension polymerizing noncrosslinking (meth) acrylic monomer (b1), crosslinking monomer (b2), and other copolymerizable monomers employed as needed. For example, manufacturing can be conducted by suspending the above monomers using polyvinyl alcohol as a dispersing agent, and polymerizing, filtering, washing, grading, and drying them.

The ratio of noncrosslinking (meth)acrylic monomer (b1) and crosslinking monomer (b2) employed in manufacturing (meth)acrylic resin microparticles is desirably 90 to 99 mass percent of noncrosslinking (meth)acrylic monomer (b1) and 10 to 1 mass percent of crosslinking monomer (b2) (where the total of noncrosslinking (meth)acrylic monomer (b1) and crosslinking monomer (b2) is adopted as 100 mass percent). When the quantity of crosslinking monomer (b2) is excessively small, dispersion in the resin components of the bead-like crosslinked (meth)acrylic resin microparticles obtained becomes poor. Conversely, an excessively large blending ratio of crosslinking monomer (b2) is undesirable in that (meth)acrylic resin microparticles (B) become excessively hard and the impact strength diminishes.

Acrylic resin microparticles having an average particle diameter with a specific range and a specific particle diameter distribution, such that the number based particle diameters thereof as measured by the Coulter counter method over a diameter range of 0.4 to 12 μm satisfy the conditions of (i) to (iii) below, are desirable as the (meth)acrylic resin microparticles:

(i) an average particle diameter of 1 to 4 μm;

(ii) a ratio of particles with a particle diameter of equal to or greater than 1 μm but less than 2 μm, a ratio of particles with a particle diameter of equal to or greater than 2 μm but less than 3 μm, and a ratio of particles with a particle diameter of equal to or greater than 3 μm each falling within a range of 20 to 40%; and (iii) essentially not containing particles with a particle diameter of equal to or greater than 10 μm.

In (ii) above, the term "ratio of particles" refers to the ratio of particles within a particle diameter range when the total number within the particle diameter range of 0.4 to 12 μm is adopted as 100%, and will also occasionally be referred to as the "number based frequency."

That is, in the present invention, the desirable (meth) acrylic resin microparticles have an average particle diameter of 1 to 4 μm, which is smaller than the commonly employed average particle diameter of 6 to 10 μm. Further, the average particle diameter, in contrast to the conventional wisdom that a monodispersion is good, are particles having a broad particle diameter distribution that satisfies condition (ii) above.

In the present invention, the particle diameter and the particle diameter distribution are measured by the Coulter counter method based on number, as set forth above. In the present invention, in the measurement of the particle diameter of (meth)acrylic resin microparticles, to eliminate the effects of extremely small microparticles and extremely large microparticles, increase reliability, and achieve data that are highly reproducible, measurement is defined as being conducted over the diameter range of 0.4 to 12 μm. The average particle diameter is also number based.

In the present invention, the average particle diameter refers to the median diameter $D_{50}$ as measured by a laser diffraction particle size distribution measuring apparatus. Measurements were conducted using a Shimadzu "Laser Diffraction Particle Size Distribution Measuring Apparatus SALD-2100 made by Shimadzu.

The (meth)acrylic resin microparticles employed in the present invention satisfy condition (i) above, that is, have an average particle diameter of 1 to 4 μm. Keeping the average particle diameter within the stated range greatly enhances light transmittance and the degree of dispersion. The average particle diameter of the (meth)acrylic resin microparticles is desirable 1 to 3 μm, preferably 1.5 to 3 μm.

Further, the (meth)acrylic resin microparticles satisfy condition (iii) above. That is, particles with a particle diameter of equal to or greater than 10 μm (preferably equal to or greater than 8 μm) are desirably essentially not contained. When particles with a particle diameter of equal to or greater than 10 μm are contained, impact resistance, which is a characteristic that is of great necessity in an illuminated member, decreases.

The phrase "essentially not containing" referring to the particles with a particle diameter of equal to or greater than 10 μm that are essentially not contained includes the case where no particles of the specified particle diameter are contained, and the case where none are detected by the above particle size distribution measuring apparatus.

The (meth)acrylic resin microparticles of the above average particle diameter and particle diameter distribution can be manufactured by a variety of methods. The manufacturing method is not specifically limited. The emulsion polymerization method and the suspension polymerization method are desirable methods that permit the direct manufacturing by polymerization of particles of such average particle diameter and particle diameter distribution. When manufacturing (meth)acrylic resin microparticles directly by polymerization, the particle diameter can be controlled by means of the polymerization conditions. For example, a homogenizer can be used to render the particle diameter a certain size. With regard to the particle diameter distribution, a polymer with a broad distribution can be obtained by not applying excessive shear force.

Further, the (meth)acrylic resin obtained in a solid state can be pulverized by a pulverizing apparatus such as a jet stream pulverizer, mechanical impact crusher, roll mill, hammer mill, or impeller breaker. The pulverized product obtained can be graded with a grading apparatus such as an air grading apparatus or sieve grading apparatus to control the particle diameter of the particles.

A selection can be made among the various (meth)acrylic resin microparticles known in a commercial manner.

In the present invention, one type of the (meth)acrylic resin microparticles can be employed singly or two or more can be mixed for use. For example, two or more (meth)acrylic resin microparticles of differing resin materials can be employed in combination, or two or more (meth)acrylic resin microparticles of differing average particle diameter or particle diameter distribution can be employed in combination. In either case, when employing two or more (meth)acrylic resin microparticles, the mixture should satisfy conditions (i) to (iii) set forth above.

In the aromatic polycarbonate resin composition of the present invention, the content of the (meth)acrylic resin microparticles is 0.01 to 10 mass parts, desirably 0.1 to 10 mass parts, preferably 0.3 to 5 mass parts, and more preferably, 0.5 to 2 mass parts per 100 mass parts of aromatic polycarbonate resin (A). When the ratio of the content of (meth)acrylic resin microparticles is less than 0.01 mass part, it becomes impossible to achieve adequate transmittance and light-diffusing property-enhancing effects. To enhance transmittance and the light-diffusing property, the incorporation of equal to or greater than 0.1 mass part of the (meth)acrylic resin microparticles is desirable. Conversely, it is undesirable for the ratio of the content of the (meth)acrylic resin microparticles to exceed 10 mass parts because the impact resistance and the like tend to decrease.

[Organic Sulfonic Acid Metal Salt (C)]

The aromatic polycarbonate resin composition of the present invention contains a flame retardant (C) in the form of an organic sulfonic acid metal salt in addition to aromatic polycarbonate resin (A) and microparticles (B). Examples or organic sulfonic acid metal salts are aliphatic sulfonic acid metal salts and aromatic sulfonic acid metal salts. Of these, aromatic sulfone sulfonic acid metals salts and perfluoroalkanesulfonic acid metal salts are desirable, and perfluoroalkane sulfonic acid metal salts are preferred.

The metal in the organic sulfonic acid metal salt is not specifically limited. Desirable examples are sodium, lithium, potassium, rubidium, cesium, and other alkali metals; and beryllium, magnesium, calcium, strontium, barium, and other alkaline earth metals. Of these, from the perspectives of flame retardance and resistance to hydrolysis, potassium is desirable. These organic sulfonic acid metals salts can be employed in mixtures of two or more.

Desirable examples of aromatic sulfone sulfonic acid metal salts are aromatic sulfone sulfonic acid alkali metal salts and aromatic sulfone sulfonic acid alkaline earth metal salts. The aromatic sulfone sulfonic acid alkali metal salts and aromatic sulfone sulfonic acid alkaline earth metal salts can be polymers.

Specific examples of aromatic sulfone sulfonic acid metal salts are diphenylsulfone-3-sulfonic acid sodium salt, diphenylsulfone-3-sulfonic acid potassium salt, 4,4'-dibromodiphenylsulfone-3-sulfone sodium salt, 4,4'-dipromodiphenylsulfone-3-sulfone potassium salt, 4-chloro-4'-nitrodiphenylsulfone-3-sulfonic acid calcium salt, diphenylsulfone-3,3'-disulfonic acid disodium salt, and diphenylsulfone-3,3'-disulfonic acid dipotassium salt.

Desirable examples of perfluoroalkanesulfonic acid metal salts are perfluoroalkanesulfonic acid alkali metal salts and perfluoroalkanesulfonic acid alkaline earth metal salts. Preferred examples are sulfonic acid alkali metal salts having perfluoroalkane groups with 4 to 8 carbon atoms, and sulfonic acid alkaline earth metal salts having perfluoroalkane groups with 4 to 8 carbon atoms.

Specific examples of perfluoroalkanesulfonic acid metal salts are sodium perfluorobutane sulfonate, potassium perfluorobutane sulfonate, sodium perfluoromethylbutane sulfonate, potassium perfluoromethylbutane sulfonate, sodium perfluorooctane sulfonate, potassium perfluorooctane sulfonate, and perfluorobutanesulfonic acid tetraethylammonium salt.

Of these, potassium perfluorobutane sulfonate is desirable.

The aromatic polycarbonate resin composition of the present invention contains 0.005 mass part to 0.1 mass part, desirably 0.01 mass part to 0.1 mass part of organic sulfonic acid metal salt (C) per 100 mass parts of aromatic polycarbonate resin (A). When the content of organic sulfonic acid metal salt is less than 0.005 mass part, it becomes difficult to achieve adequate flame retardance. From this perspective, equal to or greater than 0.01 mass part, equal to or greater than 0.03 mass part, or equal to or greater than 0.05 mass part is desirable. When 0.1 mass part is exceeded, thermal stability and resistance to hydrolysis tend to diminish. From that perspective, equal to or less than 0.1 mass part, or equal to or less than 0.09 mass part, is desirable.

[Ultraviolet Absorbent (D)]

The aromatic polycarbonate resin composition of the present invention desirably further contains a UV absorbent (D).

Examples of ultraviolet absorbent (D) are cerium oxide, zinc oxide, and other inorganic ultraviolet absorbents; benzotriazole compounds, benzophenone compounds, salicylate compounds, cyanoacrylate compounds, triazine compounds, oxanilide compounds, malonic acid ester compounds, hindered amine compounds, and other organic ultraviolet absorbents. Of these, the organic ultraviolet absorbents are desirable, and benzotriazole compounds are preferred. Through the selection of an organic ultraviolet absorbent, it is possible to improve the transparence and mechanical and physical properties of the aromatic polycarbonate resin composition of the present invention.

Specific examples of benzotriazole compounds are 2-(2'-hydroxy-5'-methylphenyl)benzotriazole, 2-[2'-hydroxy-3', 5'-bis(α,α-dimethylbenzyl)phenyl]benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)benzotriazole, 2-(2'-hydroxy-5'-tert-octylphenyl) benzotriazole, and 2,2'-methylenebis[4-(1,1,3,3-tetramethylbutyl)-6-(2N-benzotriazole-2-yl)phenol]. Of these, 2-(2'-hydroxy-5'-tert-octylphenyl)benzotriazole, and 2,2'-methylenebis[4-(1,1,3,3-tetramethylbutyl)-6-(2N-benzotriazole-2-yl)phenol] are desirable, and 2-(2'-hydroxy-5'-tert-octylphenyl)benzotriazole is preferred. Specific examples of such benzotriazole compounds are Seesorb 701, Seesorb 705, Seesorb 703, Seesorb 702, Seesorb 704, and Seesorb 709 made by Shipro Kasei Kaisha, Ltd.; Viosorb-520, Viosorb-582, Viosorb-580, and Viosorb-583 made by Kyodo Chemical Co., Ltd.; Kemisorb 71 and Kemisorb 72 made by Chemipro Kasei; Cyasorb UV-5411 made by Cytec Industries; LA-32, LA-38, LA-36, LA-34, and LA-31 made by Adeka Corporation; and Tinuvin P, Tinuvin 234, Tinuvin 326, Tinuvin 327, and Tinuvin 328 made by Ciba Specialty Chemicals.

Specific examples of benzophenone compounds are 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, and 2,2'-dihydroxy-4,4'-dimethoxybenzophenone. Specific examples of such benzopheone compounds are: Seesorb 100, Seesorb 101, Seesorb 101S, Seesorb 102, and Seesorb 103 made by Shipro Kasei Kaisha, Ltd.; Viosorb-100, Viosorb-110, and Viosorb-130 made by Kyodo Chemical Co., Ltd.; Kemisorb 10, Kemisorb 11, Kemisorb 11S, Kemisorb 12, Kemisorb 13, and Kemisorb 111 made by Chemipro Kasei; Uvinul 400 made by BASF; Uvinul M-40 made by BASF; Uvinul MS-40 made by BASF; Cyasorb UV9, Cyasorb UV284, Cyasorb UV531, and Cyasorb UV24 made by Cytec Industries; and Adeka Stab 1413 and Adeka Stab LA-51 made by Adeka Corporation.

Specific examples of salicylate compounds are phenyl salicylate and 4-tert-butylphenyl salicylate. Specific examples of such salicylate compounds are Seesorb 201 and Seesorb 202 made by Shipro Kasei Kaisha, Ltd.; and Kemisorb 21 and Kemisorb 22 made by Chemipro Kasei.

Specific examples of cyanoacrylate compounds are ethyl-2-cyano-3,3-diphenyl acrylate and 2-ethylhexyl-2-cyano-3,3-diphenyl acrylate. Specific examples of such cyanoacrylate compounds are Seesorb 501 made by Shipro Kasei Kaisha Ltd.; Viosorb-910 made by Kyodo Chemical Co., Ltd.; Uvisolator 300 made by Daiichi-Kasei Co., Ltd.; Uvinul N-35 and Uvinul N-539 made by BASF.

A specific example of an oxanilide compound is 2-ethoxy-2'-ethyloxalinic acid bisalinide. A specific example of such an oxanilide compound is Sanduvor VSU made by Clariant.

As malonic ester compounds, 2-(alkylidene)malonic esters are desirable and 2-(1-arylalkylidene)malonic esters are preferred. Specific examples of such malonic ester compounds are PR-25 made by Clariant and B-CAP made by Ciba Specialty Chemicals.

When the aromatic polycarbonate resin composition of the present invention contains a ultraviolet absorbent (D), the content is normally equal to or greater than 0.05 mass part, desirably equal to or greater than 0.1 mass part, and normally equal to or less than 1 mass part, desirably equal to or less than 0.5 mass part, per 100 mass parts of aromatic polycarbonate resin (A). When the content of ultraviolet absorbent (D) is less than the lower limit of the above range, the weatherability-enhancing effect may become inadequate. When the content of ultraviolet absorbent (D) exceeds the upper limit of the above range, mold deposits may be produced and the possibility of metal mold contamination develops.

One type of ultraviolet absorbent (D) can be incorporated, or two or more can be incorporated in any combination and in any ratio.

[Other Additives]

The aromatic polycarbonate resin composition of the present invention can further contain various additives to the extent that the effect of the present invention is not compromised. Examples of such additives are thermal stabilizers, oxidation inhibitors, mold release agents, flame retardants, flame retardant adjuvants, dyes and pigments, fluorescent brighteners, anti-dripping agents, antistatic agents, antifogging agents, lubricants, antiblocking agents, flow modifying agents, plasticizers, dispersing agents, and antibacterial agents.

<Phosphorus Thermal Stabilizer (E)>

Phosphorus thermal stabilizer (E) is generally effective in the course of melt kneading resin components and for enhancing retention stability at elevated temperatures and thermal stability when used in molded resin articles.

Examples of the phosphorus thermal stabilizer (E) employed in the present invention are phosphorous acid, phosphoric acid, phosphorous esters, and phosphoric esters. Of these, phosphorous esters such as phosphites and phosphonites contain trivalent phosphorus and are desirable from the perspective of the ease of achieving a colorfast effect.

Examples of phosphites are triphenyl phosphite, tris(nonylphenyl)phosphite, dilaurylhydrogen phosphite, triethyl phosphite, tridecyl phosphite, tris(2-ethylhexyl)phosphite, tris(dodecyl)phosphite, tristearylphosphite, diphenylmonodecyl phosphite, monophenyl didecyl phosphite, diphenylmono(tridecyl)phosphite, tetraphenyl dipropylene glycol diphosphite, tetraphenyl tetra(dodecyl)pentaerythritol tetraphosphite, hydrogenated bisphenol A phenol phosphite polymer, diphenylhydrogen phosphite, 4,4'-butylidene-bis(3-methyl-6-tert-butylphenyl di(tridecyl)phosphite)tetra(tridecyl)-4,4'-isopropylidene diphenyl diphosphite, bis(tridecyl) pentaerythritol diphosphite, bis(nonylphenyl)pentaerythritol diphosphite, dilauryl pentaerythritol diphosphite, distearyl pentaerythritol diphosphite, tris(4-tert-butylphenyl)phosphite, tris(2,4-di-tert-butylphenyl)phosphite, hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylenebis(4,6-di-tert-butylphenyl)octyl phosphite, and bis (2,4-dicumylphenyl)pentaerythritol diphosphite.

Examples of phosphonites are tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis (2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6'-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, and tetrakis(2,6-di-tert-butylphenyl)-3,3'-biphenylene diphosphonite.

Examples of acid phosphates are methyl acid phosphate, ethyl acid phosphate, propyl acid phosphate, ispropyl acid phosphate, butyl acid phosphate, butoxy ethyl acid phosphate, ocryl acid phosphate, 2-ethylhexyl acid phosphate, decyl acid phosphate, lauryl acid phosphate, stearyl acid phosphate, oleyl acid phosphate, behenyl acid phosphate, phenyl acid phosphate, nonyl phenyl acid phosphate, cyclohexyl acid phosphate, phenoxyethyl acid phosphate, alkoxy polyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate, and bis-nonylphenyl acid phosphate.

Among the phosphorous esters, distearyl pentaerythritol diphosphite, tris(2,4-di-tert-butylphenyl)phosphite, bis(2,6-di-tert-butyl-4-methylphenyl)pentaerythritol diphosphite, 2,2'-methylenebis(4,6-di-tert-butylphenyl)octylphosphite, and bis(2,4-dicumylphenyl)pentaerythritol diphosphite are desirable. From the perspectives of good thermal resistance and resistance to hydrolysis, tris(2,4-di-tert-butylphenyl) phosphite is preferred.

These phosphorus thermal stabilizers (E) can be employed singly or in combinations of two or more.

When the aromatic polycarbonate resin composition of the present invention contains phosphorus thermal stabilizer (E), the content is normally equal to or greater than 0.001 mass part, desirably equal to or greater than 0.003 mass part, and preferably equal to or greater than 0.005 mass part, usually equal to or less than 0.1 mass part, desirably equal to or less than 0.08 mass part, and preferably equal to or less than 0.06 mass part per 100 mass parts of aromatic polycarbonate resin (A). When the content of phosphorus thermal stabilizer (E) is less than the lower limit of the above range, the thermal stabilizing effect is sometimes inadequate. When the content of phosphorus thermal stabilizer (E) exceeds the upper limit of the above range, the effect sometimes peaks and becomes uneconomical.

<Mold Release Agent (F)>

The aromatic polycarbonate resin composition of the present invention can contain a mold release agent (F). Fully esterified compounds of aliphatic carboxylic acids and aliphatic alcohols are suitably employed as mold release agents.

Examples of aliphatic carboxylic acids constituting fully esterified compounds are saturated and unsaturated aliphatic monocarboxylic acids, dicarboxylic acids, and tricarboxylic acids. In this context, the term "aliphatic carboxylic acid" includes alicyclic carboxylic acids. Examples of desirable aliphatic carboxylic acids are mono and dicarboxylic acids with 6 to 36 carbon atoms. Aliphatic saturated monocarboxylic acids with 6 to 36 carbon atoms are preferred. Specific examples of such aliphatic carboxylic acids are palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid, and azelaic acid.

Examples of aliphatic alcohol components constituting fully esterified compounds are saturated and unsaturated monohydric alcohols and saturated and unsaturated polyhydric alcohols. These alcohols can contain substituents such as fluorine atoms and aryl groups. Of these alcohols, monohydric and polyhydric saturated alcohols with not more than 30 carbon atoms are desirable, and aliphatic saturated monohydric alcohols and polyhydric alcohols with not more than 30 carbon atoms are preferred. The term aliphatic alcohol as used here includes alicyclic alcohols.

Specific examples of these alcohols are octanols, decanols, dodecanols, stearyl alcohol, behenyl alcohol, ethylene glycol, diethylene glycol, glycerin, pentaerythritol, 2,2-dihydroxyperfluoropropanol, neopentylene glycol, ditrimethylol propane, and dipentaerythritol.

The fully esterified compound of the above aliphatic carboxylic acid and the above aliphatic alcohol need not necessarily have an esterification rate of 100%; equal to or higher than 80% will suffice. The esterification rate of the fully esterified compound relating to the present invention is desirably equal to or higher than 85%, preferably equal to or higher than 90%.

The fully esterified compound of an aliphatic carboxylic acid and an aliphatic alcohol that is employed in the present invention desirably contains one or more fully esterified compounds of a monoaliphatic alcohol and a monoaliphatic carboxylic acid, and one or more fully esterified compounds of a polyhydric aliphatic alcohol and a monoaliphatic carboxylic acid. The combined use of a fully esterified compound of a monoaliphatic alcohol and a monoaliphatic carboxylic acid with a fully esterified compound of a polyhydric aliphatic alcohol and a monoaliphatic carboxylic acid can inhibit the generation of gas during melt kneading in addition to enhancing the mold release effect, having the effect of reducing mold deposits.

Desirable examples of fully esterified compounds of monoaliphatic alcohols and monoaliphatic carboxylic acids are fully esterified compounds of stearyl alcohol and stearic acid (stearyl stearate) and fully esterified compounds of behenyl alcohol and behenic acid (behenyl behenate). Desirable examples of fully esterified compounds of polyhydric aliphatic alcohols and monoaliphatic carboxylic acids are fully esterified compounds of glycerin and stearic acid (glycerin tristearate) and fully esterified compounds of pentaerythritol and stearic acid (pentaerythritol tetrastearate). Pentaerythritol tetrastearate is preferred.

The fully esterified compound of an aliphatic alcohol and an aliphatic carboxylic acid can contain impurities in the form of an aliphatic carboxylic acid and/or an alcohol, and can be a mixture of multiple compounds.

When the aromatic polycarbonate resin composition of the present invention contains a mold release agent (F) such as a fully esterified compound of an aliphatic alcohol and an aliphatic carboxylic acid, the content is normally equal to or less than 2 mass parts, desirably equal to or less than 1 mass part, per 100 mass parts of aromatic polycarbonate resin (A). When the content of the mold release agent is excessive, resistance to hydrolysis decreases and problems such as mold contamination develop during injection molding.

When employing a fully esterified compound of a monoaliphatic alcohol and a monoaliphatic carboxylic acid in combination with a fully esterified compound of a polyhydric aliphatic alcohol and a monoaliphatic carboxylic acid as mold release agent (F), the use proportion (mass ratio) of the above compounds is desirably fully esterified compound of monoaliphatic alcohol and monoaliphatic carboxylic acid: fully esterified compound of polyhydric aliphatic alcohol and monoaliphatic carboxylic acid=1:1 to 10 so as to reliably obtain the above effects.

<Siloxane Compound (G)>

The polycarbonate resin composition of the present invention can contain a siloxane compound (G). Incorporating a siloxane compound simultaneously with an organic sulfonic acid metal salt can enhance the flame retardance of the polycarbonate resin composition of the present invention. The use of a methyl phenyl silicone oil is particularly desirable, making it possible to obtain a polycarbonate resin composition achieving a good balance between high transparence and high flame retardance, as well as exhibiting good stability with respect to thermal aging, humidity, and heat.

<Oxidation Inhibitor>

The aromatic polycarbonate resin composition of the present invention desirably contains an oxidation inhibitor, as needed. Incorporating an oxidation inhibitor can inhibit color deterioration and diminished mechanical and physical properties during heat retention.

Examples of oxidation inhibitors are hindered phenol oxidation inhibitors. Specific examples are pentaerythritol tetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphoate, 3,3'3",5,5',5"-hexa-tert-butyl-α,α',α"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-ditert-butyl-4-hydroxybenzyl)-1,3,5-triazine-2,4,6(1H, 3H, 5H)-trione, and 2,6-di-tert-butyl-4-(4,6-bis(octylthio)-1,3,5-triazine-2-ylamino)phenol.

Of these, pentaerythritol tetrakis[3-(3,5-di-tert-butyl-4-hydroxyphenyl)propionate] and octadecyl-3-(3,5-di-tert-butyl-4-hydroxyphenyl)propionate are desirable. Examples of commercially available products of such phenol oxidation inhibitors are Irganox 1010 and Irganox 1076 made by Ciba, and Adeka Stab AO-50 and Adeka Stab AO-60 made by Adeka.

A single oxidation inhibitor can be incorporated, or two or more can be incorporated in any combination and ratio.

When the aromatic polycarbonate resin composition of the present invention contains an oxidation inhibitor, the content is normally equal to or greater than 0.0001 mass part, desirably equal to or greater than 0.001 mass part, preferably equal to or greater than 0.01 mass part, and normally equal to or less than 3 mass parts, desirably equal to or less than 1 mass part, preferably equal to or less than 0.5 mass part, and more preferably, equal to or less than 0.3 mass part, per 100 mass parts of aromatic polycarbonate resin (A). When the content of the oxidation inhibitor is less than the lower limit of the above range, the oxidation-inhibiting effect will sometimes be inadequate. When the content of the oxidation inhibitor exceeds the upper limit of the above range, the effect will sometimes peak and be uneconomical.

<Anti-Dripping Agent>

To the extent that the object of the present invention is not compromised, the aromatic polycarbonate resin composition of the present invention can contain an anti-dripping agent in the form of a fluorine resin in a proportion of 0.01 to 1 mass part per 100 mass parts of aromatic polycarbonate resin (A). Incorporating such a fluorine resin can improve the melt characteristics of the resin composition. Specifically, it can enhance the anti-dripping property during combustion. However, by adjusting the Q value by suitably controlling the molecular weight and mixing ratio of aromatic polycarbonate resins (a1) and (a2) in the aromatic polycarbonate resin composition of the present invention, it is possible to achieve a good anti-dripping property during combustion even without incorporating a fluorine resin.

When employing a fluorine resin in a content of less than 0.01 mass part, the flame retardance-enhancing effect of the fluorine resin tends to be inadequate. When 1 mass part is exceeded, defects in the appearance of molded articles molded from the aromatic polycarbonate resin composition tend to appear and mechanical strength tends to diminish. The lower limit of the fluorine resin content is preferably equal to or greater than 0.05 mass part, more preferably equal to or greater than 0.1 mass part, and still more preferably, equal to or greater than 0.2 mass part. The upper limit is preferably equal to or less than 0.75 mass part, more preferably equal to or less than 0.6 mass part, and still more preferably, equal to or less than 0.5 mass part.

Fluoro-olefin resins are desirable as fluorine resins. Fluoro-olefin resins are normally polymers or copolymers comprising fluoroethylene structures. Specific examples are difluoroethylene resins, tetrafluoroethylene resins, and tetrafluoroethylene/hexafluoropropylene copolymer resins. Of these, the tetrafluoroethylene resins are desirable.

Fluorine resins that are capable of forming fibrils are desirable. Specific examples are fluoro-olefin resins that are capable of forming fibrils. The presence of such fibril-forming capability tends to greatly enhance the anti-dripping property during combustion.

Examples of fluoro-olefin resins with the ability to form fibrils are Teflon (registered trademark) 6J made by DuPont-Mitsui Fluorochemicals Co., Ltd., Polyflon (registered trademark) F201L, Polyflon (registered trademark) F103, and Polyflon (registered trademark) FA500 made by Daikin Industries, Ltd. Examples of commercial products in the form of aqueous dispersions of fluoro-olefin resins are Teflon (registered trademark) 30J and Teflon (registered trademark) 31-JR made by DuPont-Mitsui Fluorochemicals Co., Ltd. and Fluon (registered trademark) D-1 made by Daikin Industries, Ltd.

Organic polymer-coated fluoro-olefin resins can also be suitably employed. The use of organic polymer-coated fluoro-olefin resins can enhance dispersion, improve the external surface appearance of molded articles, and inhibit foreign matter on the surface. Organic polymer-coated fluoro-olefin resins can be manufactured by various known methods. Examples are: (1) the manufacturing method of admixing a polyfluoroethylene particle aqueous dispersion and an organic polymer particle aqueous dispersion and forming a powder by solidification or spray drying; (2) the manufacturing method of polymerizing a monomer constituting an organic polymer in the presence of an aqueous dispersion of polyfluoroethylene particles, and then forming a powder by solidification or spray drying; and (3) the manufacturing method of emulsion polymerizing a monomer having ethylenic unsaturated bonds in a dispersion obtained by mixing a polyfluoroethylene particle aqueous dispersion and an organic polymer particle aqueous dispersion, and then forming a powder by solidification or spray drying.

The organic polymer used to coat the fluoro-olefin resin is not specifically limited. Specific examples of monomers forming such organic polymers are:

styrene, α-methyl styrene, p-methyl styrene, o-methyl styrene, tert-butyl styrene, o-ethyl styrene, p-chloro styrene, o-chloro styrene, 2,4-dichloro styrene, p-methoxy styrene, o-methoxy styrene, 2,4-dimethyl styrene, and other aromatic vinyl monomers;

methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate, cyclohexyl methacrylate, and other (meth)acrylic ester monomers;

acrylonitrile, methacrylonitrile, and other cyanate vinyl monomers;

α,β-unsaturated carboxylic acids such as maleic anhydride;

N-phenyl maleimide, N-methyl maleimide, N-cyclohexyl maleimide, and other maleimide monomers;

glycidyl methacrylate and other glycidyl group-containing monomers;

vinyl methyl ether, vinyl ethyl ether, and other vinyl ether monomers;

vinyl acetate, vinyl butyrate, and other vinyl carboxylate monomers;

ethylene, propylene, isobutylene, and other olefin monomers; and butadiene, isoprene, dimethyl butadiene, and other diene monomers.

These monomers can be employed singly or in mixtures of two or more.

Of these, from the perspective of dispersion in the course of blending the aromatic polycarbonate resin, monomers for forming organic polymers covering fluoro-olefin resins that have high affinity for aromatic polycarbonate resins are desirable, and aromatic vinyl monomers, (meth)acrylic ester monomers, and cyanate vinyl monomers are preferred.

The ratio of the content of the fluoro-olefin resin in the organic polymer-coated fluoro-olefin resin is normally equal to or greater than 30 mass percent, desirably equal to or greater than 35 mass percent, preferably equal to or greater than 40 mass percent, and still more preferably, equal to or greater than 45 mass percent; and normally equal to or less than 95 mass percent, desirably equal to or less than 90 mass percent, preferably equal to or less than 80 mass percent, and more preferably, equal to or less than 75 mass percent. Keeping the ratio of the content of fluoro-olefin resin in the organic polymer coated fluoro-olefin resin within the above range is desirable to improve the balance between flame retardance and the appearance of molded articles.

Specific examples of such organic polymer-coated fluoro-olefin resins are Metablen (registered trademark) A-3800 made by Mitsubishi Rayon, Blendex (registered trademark) 449 made by GE Specialty Chemicals, and Poly TS AD001 made by PIC.

One fluorine resin can be incorporated, or any combination of two or more in any ratio can be incorporated.

<Dyes and Pigments>

The aromatic polycarbonate resin composition of the present invention can incorporate dyes and pigments as needed. The incorporating of dyes and pigments can improve the masking property and weatherability of the aromatic polycarbonate resin composition of the present invention, as well as enhancing the design properties of the molded article obtained by molding the aromatic polycarbonate resin composition of the present invention.

Examples of dyes and pigments are inorganic pigments, organic pigments, and inorganic dyes.

Examples of inorganic pigments are carbon black, cadmium red, cadmium yellow, and other sulfate pigments; silicate pigments such as ultramarine; oxide pigments such as titanium oxide, zinc oxide, red iron oxide, chromium oxide, black iron oxide, titanium yellow, zinc-iron brown, titanium cobalt green, cobalt green, cobalt blue, copper-chromium black, and copper-iron black; chromic acid-based pigments such as chrome yellow and molybdate orange; and ferrocyanide-based pigments such as Prussian blue.

Examples of organic pigments and organic dyes are copper phthalocyanine blue, copper phthalocyanine green, and other phthalocyanine dyes and pigments; nickel azo yellow and other azo dyes and pigments; thioindigo, perinone, perylene, quinacridone, dioxazine, isoindolinone, quinophthalone, and other condensed polycyclic dyes and pigments; and anthraquinone, heterocyclic ring system, and methyl-system dyes and pigments.

Of these, from the perspective of thermal stability, titanium oxide, carbon black, cyanines, quinolines, anthraquinones, and phthalocyanine compounds are desirable.

A single dye or pigment can be incorporated, or a combination of two or more in any ratio can be incorporated.

Further, polystyrene resins, polycarbonate resins, acrylic resins, and master batched dyes and pigments can be employed with the goal of enhancing dispersion in the resin composition and improving handling properties during extrusion.

The content of the dye or pigment when employed in the aromatic polycarbonate resin composition of the present invention can be suitably selected as needed. It is normally equal to or greater than 0.001 mass part, desirably equal to or greater than 0.01 mass part, and preferably equal to or greater than 0.1 mass part, and normally equal to or less than 3 mass parts, desirably equal to or less than 2 mass parts, preferably equal to or less than 1 mass part, and more preferably, equal to or less than 0.5 mass part per 100 mass parts of aromatic polycarbonate resin (A). When a dye or pigment is employed in a content of less than the lower limit of the range set forth above, an adequate coloring effect is sometimes not achieved. When the content of the dye or pigment exceeds the upper limit of the range set forth above, mold deposits may occur and the mold sometimes becomes contaminated.

<Antistatic Agents>

Antistatic agents can be incorporated as needed into the aromatic polycarbonate resin composition of the present invention. The antistatic agent is not specifically limited, and is desirably a sulfonic acid phosphonium salt denoted by general formula (1) below:

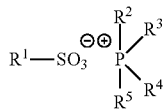

(1)

(In general formula (I), $R^1$ denotes an optionally substituted aryl group or alkyl group with 1 to 40 carbon atoms; each of $R^2$ to $R^5$ independently denotes a hydrogen atom or an aryl group or alkyl group with 1 to 10 carbon atoms, which may be identical or different.)

In general formula (I), $R^1$ denotes an aryl group or an alkyl group with 1 to 40 carbon atoms. From the perspectives of transparence, thermal resistance, and compatibility with the polycarbonate resin, an aryl group is desirable. The group derived from an alkyl benzene or an alkyl naphthalene ring substituted with an alkyl group having 1 to 34 carbon atoms, desirably 5 to 20 carbon atoms, and preferably, 10 to 15 carbon atoms, is desirable. Each of $R^2$ to $R^5$ in general formula (5) independently denotes a hydrogen atom or an aryl group or alkyl group with 1 to 10 carbon atoms; desirably denotes an alkyl with 2 to 8 carbon atoms; preferably denotes an alkyl group with 3 to 6 carbon atoms; and optimally denotes a butyl group.

Specific examples of such sulfonic acid phosphonium salts are: tetrabutyl phosphonium dodecyl sulfonate, tetrabutyl phosphonium dodecyl benzene sulfonate, tributyloctyl phosphonium dodecyl benzene sulfonate, tetraoctyl phosphonium dodecyl benzene sulfonate, tetraethyl phosphonium octadecyl benzene sulfonate, tributylmethyl phosphonium dibutyl benzene sulfonate, triphenyl phosphonium dibutylnaphthyl sulfonate, and trioctylmethyl phosphonium diisopropyl naphthyl sulfonate. Of these, from the perspective of compatibility with polycarbonate and ready availability, tetrabutyl phosphonium dodecyl benzene sulfonate is desirable.

These can be employed singly or in combinations of two or more.

The content of antistatic agent when one is employed in the aromatic polycarbonate resin composition of the present invention is desirably 0.1 to 5.0 mass parts, preferably 0.2 to 3.0 mass parts, more preferably 0.3 to 2.0 mass parts, and optimally, 0.5 to 1.8 mass parts per 100 mass parts of aromatic polycarbonate resin (A). When the content of antistatic agent is less than 0.1 mass part, no antistatic effect is achieved. When it exceeds 5.0 mass part, transparence and mechanical strength diminish, and silvering and separation of the surface of the molded article tend to occur, compromising appearance.

[Methods of Manufacturing the Aromatic Polycarbonate Resin Composition]

The method of manufacturing the aromatic polycarbonate resin composition of the present invention is not specifically limited. Known methods of manufacturing aromatic polycarbonate resin compositions can be widely employed.

As a specific example of a method, the aromatic polycarbonate resin (A) relating to the present invention, microparticles (B), organic sulfonic acid alkali metal salt (C), and other components compounded as needed, are premixed in various mixers such as a tumbler, Henschel mixer, or super mixer. Subsequently, the melt is mixed in a mixer such as a Banbury mixer, rolls, Brabender, monoaxial kneader-extruder, biaxial kneader-extruder, or kneader.

For example, without premixing the various components, or premixing only some portion thereof, a kneader can be used to feed the components into an extruder where the melt is kneaded to manufacture the aromatic polycarbonate resin composition of the present invention.

As a further example, some portion of the components can be premixed, fed into an extruder, and melt kneaded to obtain a resin composition. This can then be employed as a master batch. The master batch can then be mixed with the remaining components and melt kneaded to manufacture the aromatic polycarbonate resin composition of the present invention.

As a still further example, in the course of mixing components that are hard to disperse, such components can be dissolved or dispersed in a solvent such as water or an organic solvent in advance. The solution or dispersion can then be kneaded to enhance dispersion.

After premixing the various components by the above method, a melt kneading method in the form of a Banbury mixer, roll, Brabender, monoaxial kneader-extruder, biaxial kneader-extruder, kneader, or the like is then employed.

The temperature of the melt kneading is not specifically limited. Normally, it falls within a range of from 240 to 320° C.

The molten resin quantity Q value flowing out of an orifice 1 mm in diameter×10 mm in length at a temperature of 280° C. at a load of $1.57 \times 10^7$ Pa using a constant-load orifice-type flow tester is equal to or greater than 0.01 $cm^3$/second and equal to or lower than 0.1 $cm^3$/second for the aromatic polycarbonate resin composition of the present invention. When the Q value is less than 0.01 $cm^3$/second, fluidity is inadequate and the moldability of the material deteriorates. When it exceeds 0.1 $cm^3$/second, it tends to drip during combustion, making it difficult to achieve the desired flame retardance. The Q value of the resin composition is more or less determined by the Q value measured under identical conditions for aromatic polycarbonate resin (A). Thus, the Q value measured under the same conditions for aromatic polycarbonate resin (A) also desirably falls within the range given above. A desired Q value can be achieved for aromatic polycarbonate resin (A) by suitably controlling the molecular weight and blending ratio of aromatic polycarbonate resins (a1) and (a2) to within the above ranges.

[Molded Articles of Aromatic Polycarbonate Resin]

The aromatic polycarbonate resin composition of the present invention can be pelletized into pellets and molded by various molding methods to manufacture molded articles. The resin that has been melt kneaded in an extruder without having been pelletized can be directly extruded into molded articles such as sheets, films, and other shapes, blow-molded articles, injection-molded articles, and the like.

Examples of molding methods are injection molding, super high-speed injection molding, injection-compression molding, two-color molding, hollow molding such as gas-assisted molding, molding employing insulated molds, molding methods employing rapidly heated molds, foam molding (including supercritical fluids), insert molding, in-mold coating (IMC) molding, extrusion molding, sheet molding, hot molding, rotational molding, laminate molding, and press molding. Hot runner type molding methods can also be employed. The shape, pattern, color, dimensions, and the like of the molded article are not limited, and can be established as desired based on the application of the molded article.

Examples of desirable molded articles that can be molded from the aromatic polycarbonate resin composition of the present invention are various lighting covers, illuminated signs, light-passing screens, various displays, and the light-diffusing sheets and light-diffusing plates of liquid-crystal display devices. Of these, the resin composition is suitably employed to mold the light-diffusing sheets and light-diffusing plates employed in liquid-crystal display devices, particularly the diffusing plates of large liquid-crystal televisions.

Examples of lighting covers are the covers and lamp shades of fluorescent lamps and white-hot light bulbs, bathroom lights, chandeliers, stands, brackets, track lights, ceiling lights, hanging lights, garage lights, eave lights, gatepost lights, porch lights, garden lights, entrance lights, foot lights, staircase lights, induction lights, security lights, down lights, base lights, decorative electrical signs, and sign lighting. As further examples, the resin composition can also be suitably employed to mold covers for lights on vehicles, such as automobiles and motorcycles. It can also be suitably employed in illumination equipment used on light sources that give off little heat, such as LEDs and organic ELs.

EXAMPLES

The present invention will be described more specifically through Examples below. However, the present invention is not limited to Examples given blow. Modifications are possible within the spirit and scope of the present invention. In the description given below, unless specifically stated otherwise, "part" refers to "mass part" based on mass.

The measurement and evaluation methods as well as materials employed in Examples and Comparative Examples set forth below were as follows.

[Measurement and Evaluation Methods]

<Evaluation of Molecular Mass>

The viscosity average molecular weight (Mv) was determined by measuring a 0.2 g/dL dichloromethane solution of the polycarbonate resin at a temperature of 20° C. with an Ubbelohde capillary viscometer, calculating the limit viscosity [η] dL/g at a Huggins constant of 0.45, and calculating with the following formula:

$$\eta = 1.23 \times 10^{-4} \times Mv^{0.83}$$

<Fluidity Evaluation>

Fluidity evaluation in the form of the Q value was conducted by drying pellets obtained by the method set forth further below for 4 hours or more at 120° C. and employing a constant-load orifice-type flow tester (made by Shimadzu) to measure the amount of outflow (unit: $\times 10^{-2}$ cm$^3$/second) per unit time of polycarbonate resin composition under conditions of 280° C. and a load of $1.57 \times 10^7$ Pa (160 kgf/cm$^2$). The orifice employed was 1 mm in diameter×10 mm in length. This is noted as "Fluidity" in the table set forth below. The higher the Q value, the better the fluidity of the polycarbonate resin composition.

<Total Light Transmittance Evaluation>

Based on JIS K-7105, the three-segment plate (3 mm, 2 mm, and 1 mm in thickness) described farther below was employed as a sample. A model NDH-2000 turbidimeter made by Nippon Denshoku Industries Co., Ltd. was employ to measure the total light transmittance (unit "%") for the thicknesses of 1 mm, 2 mm, and 3 mm. This is denoted as the "Transmittance" in the table given below.

<Evaluation of Degree of Dispersion (Light-Diffusing Property)>

The three-segment plate (3 mm, 2 mm, and 1 mm in thickness) described farther below was employed as sample. A GP-5 Goniophotometer made by Murakami Color Research Laboratory was employed to measure the brightness for each of the three thicknesses of 1 mm, 2 mm, and 3 mm under conditions of incident light: 0°; tilt angle: 0°; light-receiving range: 0° to 90°; light beam aperture: 2.0; and light-receiving aperture: 3.0. The angle at which the brightness decreased by one half relative to the brightness at 0° was adopted as the degree of dispersion (°). The higher the degree of dispersion, the better the light-diffusing property. This is desirable because when the illuminated cover is in place, light from the light source is diffused more, illumination is maintained over a broader range, and there is an effect of decreasing visibility of the light source. This is denoted as "Degree of dispersion" in the table given below.

<Evaluation of Flame Retardance>

The flame retardance of the polycarbonate resin composition was evaluated by the UL94 test (combustion test of a plastic material for equipment parts) established by Underwriter Laboratories (UL) of the U.S. by the method set forth farther below using a UL test sample at a temperature of 23° C. and a relative humidity of 50% in a temperature-controlled room for 48 hours with humidity controls. UL94V refers to a method of evaluating the flame retardance from the residual flame period and dripping properties after the flame of a burner has been brought into direct contact for 10 seconds with a sample of prescribed size that is being held perpendicularly. Since V-0, V-1, and V-2 flame retardances exist, it is necessary to satisfy the standards indicated in Table 1 below.

TABLE 1

|  | V-0 | V-1 | V-2 |
|---|---|---|---|
| Residual flame residence period of each sample | Equal to or less than 10 seconds | Equal to or less than 30 seconds | Equal to or less than 30 seconds |
| Full flame residence period of 5 samples | Equal to or less than 50 seconds | Equal to or less than 250 seconds | Equal to or less than 250 seconds |
| Cotton ignition by drips | None | None | None |

The "residual flame period" referred to here is the length of time during which the flame continued to burn on the sample once the ignition source had been removed. The "cotton ignition by drips" is determined by whether or not a piece of cotton from a label positioned about 300 mm beneath the lower end of the sample was ignited by drops from the sample. This is denoted as "Flame retardance" in Tables 3 and 4 farther below.

<Evaluation of Thermal Resistance>

The three-segment plate set forth farther below (3, 2, 1 mm in thickness) was employed as sample. In accordance with JIS K-7105, the hue of the 3 mm thick portion (YI value) was measured by reflection with a model SE2000 spectroscopic colorimeter made by Nippon Denshoku Industries Co., Ltd. The sample was then hot stored for 500 hours in an air atmosphere at 130° C. and the change in the YI value following hot storage ΔYI was calculated as the index of thermal resistance. It is denoted as "Thermal resistance" in the table below.

The polycarbonate resin composition employed in Examples and Comparative Examples was prepared by the following method. That is, the various components were admixed for 20 minutes in a tumbler in the quantities (addition ratios and mass parts) indicated in the table set forth farther below; fed into a biaxial extruder (TEX30XCT) equipped with one vent made by Japan Steel Works, Ltd.; and kneaded under conditions of a screw rotational speed of 200 rpm, a discharge rate of 20 kg/hour, and a barrel temperature of 310° C. The molten resin composition was extruded in strands, quenched in a tank of water, and then pelletized in a pelletizer to obtain pellets of polycarbonate resin composition.

In the transmittance, degree of dispersion, and thermal resistance tests, the pellets that had been obtained were dried for 4 hours at 120° C. and extrusion molded under conditions of a cylinder temperature of 290° C., a mold temperature of 80° C., and a molding cycle of 50 seconds with an extrusion molder (M150AII-SJ, made by Meiki Co., Ltd.) to mold three-segment plates (3, 2, 1 mm in thickness). In the test of the combustion property (flame retardance), the pellets that had been obtained were dried for 4 hours at 120° C. and extrusion molded under conditions of a cylinder temperature of 270° C., a mold temperature of 80° C., and a molding cycle of 30 seconds with an extrusion molder (J50-EP, made by Japan Steel Works, Ltd.) to mold samples for use in the UL test measuring 125 mm in length, 13 mm in width, and 1.58 mm in thickness. They were also extrusion molded under conditions of a cylinder temperature of 280° C., a mold temperature of 80° C., and a molding cycle of 30 seconds to obtain test samples for use in the UL test measuring 125 mm in length, 13 mm in width, and 1.2 mm in thickness.

<Aromatic Polycarbonate Resin (A)>
Aromatic Polycarbonate Resin (a2)

Aromatic polycarbonate resin (a2) was synthesized by the method described below. The various aromatic polycarbonate resins (a2) obtained were named "PC-1," "PC-2," and "PC-3."

Manufacturing of PC-1:

In 40 liters of a 5 mass percent sodium hydroxide aqueous solution were dissolved 3.697 kg (16.215 moles) of bisphenol A made by Nippon Steel Chemical Co., Ltd. and 22 g of hydrosulfite. To this were then added 17 liters of dichloromethane with stirring. While maintaining the mixture at 15° C., 2.1 kg (21.212 moles) of phosgene were blown in over 15 minutes. When blowing in of the phosgene had been completed, a molecular weight adjusting agent in the form of 22.3 g of p-tert-butyl phenol made by DIC Corp. was added. Another 10 liters of 5 mass percent sodium hydroxide aqueous solution and 20 liters of dichloromethane were added. The mixture was vigorously stirred. Once the reaction solution had emulsified, 20 milliliters of triethylamine were added. The mixture was stirred for about an hour at 20 to 25° C., causing it to polymerize. Once polymerization had ended, the reaction solution was separated into an aqueous phase and an organic phase. The organic phase was neutralized with phosphoric acid and washing with water was repeatedly conducted until the electrical conductivity of the cleaning solution (aqueous phase) reached equal to or lower than 10 μS/cm. The polymer solution obtained was added dropwise to warm water maintained at 50° C. While evaporating off the solvent, the solid material was pulverized, yielding a white powdery precipitate. The precipitate obtained was filtered and dried for 24 hours at 120° C. to obtain a polymer powder.

Infrared absorption spectrum analysis of the polymer obtained revealed absorption by carbonyl groups at a position near 1,770 cm$^{-1}$ and absorption by ether bonds at a position near 1,240 cm$^{-1}$. It was confirmed to be polycarbonate resin (PC-1) having carbonate bonds. The viscosity average molecular weight (Mv) of polycarbonate resin PC-1 was $6.4 \times 10^4$.

Manufacturing of PC-2:

With the exception that in the manufacturing of PC-1 above, the quantity of p-tert-butyl phenol was changed to 19.9 g and the quantity of dichloromethane following the end of the blowing in of phosgene was changed to 30 liters, PC-2 was manufactured in the same manner as PC-1 above.

The viscosity average molecular weight (Mv) of polycarbonate resin PC-2 was $6.8 \times 10^4$.

Manufacturing of PC-3:

With the exception that in the manufacturing of PC-1 above, the quantity of p-tert-butyl phenol was changed to 16.2 g and the quantity of dichloromethane following the end of the blowing in of phosgene was changed to 40 liters, PC-3 was manufactured in the same manner as PC-1 above.

The viscosity average molecular weight (Mv) of polycarbonate resin PC-3 was $8.0 \times 10^4$.

Aromatic Polycarbonate Resin (a1)

The aromatic polycarbonate resins (PC-4, PC-5, PC-6, and PC-7) indicated in the table farther below were employed as aromatic polycarbonate resins (a1). In Comparative Examples, the aromatic polycarbonate resins (PC-8, PC-9, PC-10 (melt method polycarbonate resins)) indicated in the table farther below were used instead of aromatic polycarbonate resin (a2). These resins were all manufactured by Mitsubishi Engineering Plastics Co., Ltd.

In the synthesis example of PC-1 set forth above, the quantity of p-tert-butyl phenol was changed to 13.7 g and the quantity of dichloromethane following the end of blowing in phosgene was changed to 30 liters as PC-11. With those exceptions, synthesis was conducted in the same manner as for PC-1 above. The aromatic polycarbonate resin (PC-11) obtained had a viscosity average molecular weight of $1.0 \times 10^5$ <Microparticles (B): Polyorganosilsesquioxane Microparticles>

The polyorganosilsesquioxane microparticles (B1) to (B3) indicated in the table below were prepared. All of (B1) to (B3) were polymethylsilsesquioxane (T units 100 mole percent) microparticles.

Measurement of the particle diameters and particle diameter distributions of the polyalkylsilsesquioxane microparticles was conducted by the Coulter counter method with a particle size distribution measuring apparatus, the Multisizer 4, made by Beckman Coulter, Inc. with Isoton II as the dispersion solvent under conditions of an aperture diameter of 20 μm using ethanol as dispersing agent. Ultrasonic waves were applied for 3 minutes to uniformly disperse the particles in the measurement medium, after which measurement was conducted over a range of 0.4 to 12 μm.

TABLE 2

| Polyorganosiloxane particles | B1 | B2 | B3 |
|---|---|---|---|
| Volume average particle diameter (μm) | 2.3 | 2.88 | 5.05 |
| Particle diameter at top of $P_1$ (μm) | 2.08 | 2.6 | — |
| Particle diameter at top of $P_2$ (μm) | 2.47 | 3.22 | — |
| $P_2/P_1$ | 0.47 | 0.13 | — |
| Number-based frequency (%) over range of 0.5 to 1 μm | 3.21 | 10.13 | — |
| Volume-based frequency (%) over range of 4 to 11 μm | 0.11 | 3.8 | — |

In Examples 1 to 13 and Comparative Examples 1 to 9, potassium perfluorobutane sulfonate, made by DIC Corp. (product name: F114P) was employed as organic sulfonic acid metal salt (C) and 2-(2'-hydroxy-5'-tert-octylphenyl)-2H-benzotriazole, made by Shipro Kasei Kaisha, Ltd., product name Seesorb 709, was employed as ultraviolet absorbent (D). Tris(2,4-di-tert-butylphenyl)phosphite, made by Adeka Corp., product name Adeka Stab 2112, was employed as phosphorus thermal stabilizing agent (E). Pentaerythritol tetrastearate, made by Cognis Japan, product name: Loxiol VPG861, was employed as mold release agent (F-1) and stearic acid, made by NOF Corporation, product name: NAA180, was employed as mold release agent (F-2). Methyl phenyl silicone oil, made by Toshiba Silicone, product name: TSF437, was employed as siloxane compound (G). Hollow glass bead particles, made by Toshiba Barotini Corp., product name HSC-110, average particle diameter 10 μm, were employed as a diffusing agent other than polyorganosilsesquioxane microparticles (microparticles (B)).

The results of the various measurements obtained In Examples 1 to 13 and Comparative Examples 1 to 9 are given in Tables 3 and 4.

TABLE 3

| | | | Molecular weight | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|---|
| Formulation of resin composition (parts) | Aromatic polycarbonate resin (a1) | PC-4 H-4000 | $1.6 \times 10^4$ | 70 | 70 | 70 | 78 | 83 | 68 | — | 70 | 70 | 70 | 67 | — | 70 |
| | | PC-5 S-3000 | $2.1 \times 10^4$ | 5 | 5 | 5 | 2 | 5 | — | — | 5 | 5 | 5 | — | 98 | 5 |
| | | PC-6 H-7000 | $1.3 \times 10^4$ | — | — | — | — | — | — | 58 | — | — | — | — | — | — |
| | | PC-7 AL-071 | $5.0 \times 10^3$ | — | — | — | — | — | — | — | — | — | — | 3 | — | — |
| | Aromatic polycarbonate resin (a2) | PC-1 Synthesized compound | $6.4 \times 10^4$ | 25 | 25 | 25 | — | — | 32 | 42 | 25 | 25 | 25 | — | 2 | 25 |
| | | PC-2 Synthesized compound | $6.8 \times 10^4$ | — | — | — | 20 | — | — | — | — | — | — | 30 | — | — |
| | | PC-3 Synthesized compound | $8.0 \times 10^4$ | — | — | — | — | 12 | — | — | — | — | — | — | — | — |
| | Aromatic polycarbonate resin (other than a2) | PC-8 K-4000 | $3.6 \times 10^4$ | — | — | — | — | — | — | — | — | — | — | — | — | — |
| | | PC-9 E-2000 | $2.8 \times 10^4$ | — | — | — | — | — | — | — | — | — | — | — | — | — |
| | | PC-10 M7027 | $2.7 \times 10^4$ | — | — | — | — | — | — | — | — | — | — | — | — | — |
| | | PC-11 Synthesized compound | $1.0 \times 10^5$ | — | — | — | — | — | — | — | — | — | — | — | — | — |
| | Polyorganosilsesquioxane microparticles (B) | B1 | | 0.5 | 1.0 | 2.0 | 0.5 | 0.5 | 0.5 | 0.5 | 0.5 | — | — | 0.5 | 0.5 | 0.5 |
| | | B2 | | — | — | — | — | — | — | — | — | — | 0.5 | — | — | — |
| | | B3 | | — | — | — | — | — | — | — | — | 0.5 | — | — | — | — |
| | Organic sulfonic acid metal salt (C) | | | 0.09 | 0.09 | 0.09 | 0.09 | 0.09 | 0.1 | 0.1 | 0.1 | 0.1 | 0.1 | 0.09 | 0.1 | 0.08 |
| | Hollow glass beads (H) | | | — | — | — | — | — | — | — | — | — | — | — | — | — |
| | Ultraviolet absorbent (D) | | | 0.3 | 0.3 | 0.3 | 0.3 | 0.3 | 0.3 | 0.3 | 0.3 | 0.3 | 0.3 | 0.3 | 0.3 | 0.3 |
| | Phosphorus thermal stabilizing agent (E) | | | 0.03 | 0.03 | 0.03 | 0.03 | 0.03 | 0.03 | 0.03 | 0.03 | 0.03 | 0.03 | 0.03 | 0.03 | 0.03 |
| | Mold release agent (F-2) | | | 0.1 | 0.1 | 0.1 | 0.1 | 0.1 | 0.1 | 0.1 | 0.1 | 0.1 | 0.1 | 0.1 | 0.1 | 0.1 |
| | Mold release agent (F-2) | | | 0.1 | 0.1 | 0.1 | 0.1 | 0.1 | 0.1 | 0.1 | 0.1 | 0.1 | 0.1 | 0.1 | 0.1 | 0.1 |
| | Silicone compound (G) | | | — | — | — | — | — | — | — | — | 1 | — | — | — | — |
| Evaluation results | Fluidity (280° C.) | | ($\times 10^{-2}$ cm$^3$/sec) | 7.8 | 8.0 | 8.0 | 7.9 | 8.3 | 5.1 | 3.5 | 8.6 | 7.8 | 7.9 | 7.4 | 8.1 | 7.7 |
| | Transmittance (%) | 1 mmt | | 74 | 66 | 58 | 74 | 73 | 74 | 73 | 73 | 82 | 82 | 74 | 73 | 74 |
| | Degree of dispersion | 1 mmt | | 29 | 49 | 59 | 30 | 29 | 30 | 30 | 29 | 4 | 8 | 29 | 30 | 30 |
| | Transmittance (%) | 2 mmt | | 58 | 52 | 48 | 58 | 57 | 57 | 57 | 58 | 67 | 65 | 58 | 58 | 58 |
| | Degree of dispersion | 2 mmt | | 47 | 57 | 62 | 48 | 47 | 48 | 47 | 48 | 13 | 30 | 48 | 47 | 48 |
| | Transmittance (%) | 3 mmt | | 48 | 45 | 41 | 49 | 47 | 49 | 47 | 47 | 56 | 53 | 48 | 49 | 49 |
| | Degree of dispersion | 3 mmt | | 52 | 58 | 64 | 52 | 51 | 51 | 52 | 53 | 18 | 36 | 52 | 51 | 52 |
| | Flame retardance 1.58 mmt | Number of drips | | 0/10 | 0/10 | 0/10 | 0/10 | 0/10 | 0/10 | 0/10 | 0/10 | 0/10 | 0/10 | 0/10 | 0/10 | 0/10 |
| | | Number of surface ignition | | 0/10 | 0/10 | 0/10 | 0/10 | 0/10 | 0/10 | 0/10 | 0/10 | 0/10 | 0/10 | 0/10 | 0/10 | 0/10 |
| | | TOTAL/MAX | | 29/6 | 37/8 | 36/9 | 31/7 | 36/9 | 36/8 | 31/6 | 36/7 | 38/7 | 38/8 | 32/7 | 42/9 | 39/8 |
| | | UL94 | | V-0 | V-0 | V-0 | V-0 | V-0 | V-0 | V-0 | V-0 | V-0 | V-0 | V-0 | V-0 | V-0 |
| | Flame retardance 1.2 mmt | Number of drips | | 0/10 | 0/10 | 0/10 | 0/10 | 0/10 | 0/10 | 0/10 | 0/10 | 0/10 | 0/10 | 0/10 | 0/10 | 0/10 |
| | | Number of surface ignition | | 0/10 | 0/10 | 0/10 | 0/10 | 0/10 | 0/10 | 0/10 | 0/10 | 0/10 | 0/10 | 0/10 | 0/10 | 0/10 |
| | | TOTAL/MAX | | 35/7 | 31/9 | 30/8 | 34/8 | 39/9 | 35/8 | 37/5 | 36/7 | 40/8 | 42/9 | 38/9 | 44/9 | 39/8 |
| | | UL94 | | V-0 | V-0 | V-0 | V-0 | V-0 | V-0 | V-0 | V-0 | V-0 | V-0 | V-0 | V-0 | V-0 |
| | Thermal resistance 130° C., 500 hours | ΔYI | | 0.77 | 0.84 | 0.88 | 0.75 | 0.99 | — | — | — | — | — | — | 0.71 | 0.66 |

TABLE 4

| | | | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|
| Formulation of resin composition (parts) | Aromatic polycarbonate resin (a1) | PC-4 | H-4000 | $1.6 \times 10^4$ | — | — | 70 | 40 | 22 | — | 72 | 70 | 70 |
| | | PC-5 | S-3000 | $2.1 \times 10^4$ | 100 | — | 5 | 8 | 8 | 20 | 8 | 5 | 5 |
| | | PC-6 | H-7000 | $1.3 \times 10^4$ | — | 69 | — | — | — | — | — | — | — |
| | | PC-7 | AL-071 | $5.0 \times 10^3$ | — | — | — | — | — | — | — | — | — |
| | Aromatic polycarbonate resin (a2) | PC-1 | Synthesized compound | $6.4 \times 10^4$ | — | 31 | 25 | — | — | — | — | 25 | 25 |
| | | PC-2 | Synthesized compound | $6.8 \times 10^4$ | — | — | — | — | — | — | — | — | — |
| | | PC-3 | Synthesized compound | $8.0 \times 10^4$ | — | — | — | — | — | — | — | — | — |
| | Aromatic polycarbonate resin (other than a2) | PC-8 | K-4000 | $3.6 \times 10^4$ | — | — | — | 52 | — | — | — | — | — |
| | | PC-9 | E-2000 | $2.8 \times 10^4$ | — | — | — | — | 70 | — | — | — | — |
| | | PC-10 | M7027 | $2.7 \times 10^4$ | — | — | — | — | — | 80 | — | — | — |
| | | PC-11 | Synthesized compound | $1.0 \times 10^5$ | — | — | — | — | — | — | 20 | — | — |
| | Polyorganosilsesquioxane microparticles (B) | B1 | | | 0.5 | 0.5 | 0.5 | 0.5 | 0.5 | 0.5 | 0.5 | — | — |
| | | B2 | | | — | — | — | — | — | — | — | — | — |
| | | B3 | | | — | — | — | — | — | — | — | — | — |
| | Organic sulfonic acid metal salt (C) | | | | 0.1 | 0.1 | 0.12 | 0.1 | 0.1 | 0.1 | 0.1 | 0.1 | 0.09 |
| | Hollow glass beads (H) | | | | — | — | — | — | — | — | — | 5.0 | — |
| | Ultraviolet absorbent (D) | | | | 0.3 | 0.3 | 0.3 | 0.3 | 0.3 | 0.3 | 0.3 | 0.3 | 0.3 |
| | Phosphorus thermal stabilizing agent (E) | | | | 0.03 | 0.03 | 0.03 | 0.03 | 0.03 | 0.03 | 0.03 | 0.03 | 0.03 |
| | Mold release agent (F-2) | | | | 0.1 | 0.1 | 0.1 | 0.1 | 0.1 | 0.1 | 0.1 | 0.1 | 0.1 |
| | Mold release agent (F-2) | | | | 0.1 | 0.1 | 0.1 | 0.1 | 0.1 | 0.1 | 0.1 | 0.1 | 0.1 |
| | Silicone compound (G) | | | | — | — | — | — | — | — | — | — | — |
| Evaluation results | Fluidity (280° C.) | | ($\times 10^{-2}$ cm$^3$/sec) | | 8.0 | 11.2 | 8.5 | 5.8 | 5.3 | 4.0 | 3.7 | 8.3 | 7.6 |
| | Transmittance (%) | 1 mmt | | | 73 | 74 | 68 | 73 | 74 | 73 | 47 | 74 | 91 |
| | Degree of dispersion | 1 mmt | | | 29 | 30 | 30 | 27 | 29 | 28 | 33 | 17 | 2 |
| | Transmittance (%) | 2 mmt | | | 57 | 58 | 52 | 58 | 58 | 57 | 36 | 56 | 89 |
| | Degree of dispersion | 2 mmt | | | 47 | 48 | 48 | 47 | 45 | 45 | 49 | 25 | 2 |
| | Transmittance (%) | 3 mmt | | | 47 | 47 | 40 | 47 | 48 | 47 | 30 | 49 | 89 |
| | Degree of dispersion | 3 mmt | | | 51 | 52 | 52 | 52 | 51 | 52 | 53 | 24 | 2 |
| | Flame retardance 1.58 mmt | Number of drips | | | 3/10 | 4/10 | 0/10 | 5/10 | 5/10 | 1/10 | 0/10 | 5/10 | 0/10 |
| | | Number of surface ignition | | | 2/10 | 4/10 | 0/10 | 5/10 | 5/10 | 1/10 | 0/10 | 5/10 | 0/10 |
| | | TOTAL/MAX | | | 39/9 | 42/9 | 29/6 | 65/15 | 44/10 | 33/7 | 30/5 | 53/8 | 38/5 |
| | | UL94 | | | V-2 | V-2 | V-0 | V-2 | V-2 | V-2 | V-0 | V-2 | V-0 |
| | Flame retardance 1.2 mmt | Number of drips | | | | | 2/10 | | | | 0/10 | | 0/10 |
| | | Number of surface ignition | | | | | 1/10 | | | | 0/10 | | 0/10 |
| | | TOTAL/MAX | | | | | 30/6 | | | | 38/7 | | 33/7 |
| | | UL94 | | | | | V-2 | | | | V-0 | | V-0 |

TABLE 4-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Thermal resistance 130° C., 500 hours | ⊿YI | 0.51 | — | 1.15 | 0.81 | 0.78 | 7.3 | — | 2.4 | — |

Based on the results from Examples 1 to 13 given in Table 3 and Comparative Examples 1 to 9 given in Table 4, the aromatic polycarbonate resin composition of the present invention, in which a specified quantity of microparticles (B) in the form of polyorganosilsesquioxane microparticles were added to aromatic polycarbonate resin (A), was found to exhibit good total light transmittance and light-diffusing property, as well as good flame retardance and thermal resistance. Examples 1 to 8 and 11 to 13, into which polyorganosilsesquioxane microparticles (microparticles (B)) of specified average particle diameter and specified particle diameter distribution were blended, exhibited particularly good total light transmittance and light-diffusing property.

The molded articles of resin compositions other than the aromatic polycarbonate resin composition of the present invention that were obtained in Comparative Examples 1 to 6 exhibited poor flame retardance. The aromatic polycarbonate resin composition of Comparative Example 7 exhibited poor transparence, and so could be understood to have poor total light transmittance. The molded article of the melt method polycarbonate resin composition of Comparative Example 6 exhibited a markedly higher ΔYI value and poor thermal resistance. The material to which an excess quantity of organic sulfonic acid metal salt (C) was added in Comparative Example 3 and the composition containing a diffusing agent other than polyorganosilsesquioxane microparticles (microparticles (B)) in Comparative Example 8 both exhibited poor thermal resistance and high ΔYI values. Comparative Example 8, which contained a diffusing agent other than polyorganosilsesquioxane microparticles (microparticles (B)), exhibited a poor balance between total light transmittance and light-diffusing property, and was found not to have exhibited an enhanced flame retardance effect. Comparative Example 9, which did not contain polyorganosilsesquioxane microparticles (B) was found to exhibit a low degree of dispersion and no diffusing property.

<Microparticles (B): (Meth)Acrylic Resin Microparticles>

The acrylic resin microparticles (B4) to (B6) shown in the table below were each prepared.

Measurement of the particle diameters and particle diameter distributions of the acrylic resin microparticles was conducted by the Coulter counter method with a particle size distribution measuring apparatus, the Multisizer 4, made by Beckman Coulter, Inc. with Isoton II as the dispersion medium under conditions of an aperture diameter of 20 μm using ethanol as dispersing agent. Ultrasonic waves were applied for 3 minutes to uniformly disperse the particles in the measurement solvent, after which measurement was conducted over a range of 0.4 to 12 μm.

In the table below, the ratio of crosslinking monomer (b2) is the ratio of crosslinking monomer (b2) to the total of 100 mass percent of noncrosslinking (meth)acrylic monomer (b1) in the form of methyl methacrylate and crosslinking monomer (b2).

TABLE 5

| | | Average particle diameter μm | 1-2 μm ratio % | 2-3 μm ratio % | 3 μm- ratio % | 10 μm-ratio % | Crosslinking monomer % |
|---|---|---|---|---|---|---|---|
| B4 | Methyl methacrylate-trimethylol propane trimethacrylate copolymer | 2.3 | 33 | 26 | 26 | none | 4 |
| B5 | Methyl methacrylate-ethylene glycol dimethacrylate copolymer | 2.3 | 25 | 60 | 10 | none | 36 |
| B6 | Methyl methacrylate-ethylene glycol dimethacrylate copolymer | 4.5 | 0 | 20 | 80 | none | 34 |

In Examples 14 to 25 and in Comparative Examples 10 to 18, potassium perfluorobutane sulfonate, made by DIC Corp., product name: F114P, was employed as the organic sulfonic acid metal salt (C) component. Further, 2-(2'-hydroxy-5'-tert-octylphenyl)-2H-benzotriazole, made by Shipro Kasei Kaisha, Ltd., product name Seesorb 709, was employed as ultraviolet absorbent (D). Tris(2,4-di-tert-butylphenyl)phosphite, made by Adeka Corp., product name Adeka Stab 2112, was employed as phosphorus thermal stabilizing agent (E). Pentaerythritol tetrastearate, made by Cognis Japan, product name: Loxiol VPG861, was employed as mold release agent (F-1) and stearic acid, made by NOF Corporation, product name: NAA180, was employed as mold release agent (F-2). Methyl phenyl silicone oil, made by Toshiba Silicone, product name: TSF437, was employed as siloxane compound (G). Hollow glass bead particles, made by Toshiba Barotini Corp., product name HSC-110, average particle diameter 10 μm, were employed as a diffusing agent other than (meth)acrylic resin microparticles (microparticles (B)).

The various measurement results obtained in Examples 14 to 25 and Comparative Examples 10 to 18 are given in Tables 6 and 7 below.

TABLE 6

Evaluation results of Examples

| | | | | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|---|---|---|
| Formulation of resin composition (parts) | Aromatic polycarbonate resin (a1) | PC-4 | H-4000 | $1.6 \times 10^4$ | 70 | 70 | 78 | 83 | 68 | — | 70 | 70 | 70 | 67 | — | 70 |
| | | PC-5 | S-3000 | $2.1 \times 10^4$ | 5 | 5 | 2 | 5 | — | — | 5 | 5 | 5 | — | 98 | 5 |
| | | PC-6 | H-7000 | $1.3 \times 10^4$ | — | — | — | — | — | 58 | — | — | — | — | — | — |
| | | PC-7 | AL-071 | $5.0 \times 10^3$ | — | — | — | — | — | — | — | — | — | 3 | — | — |
| | Aromatic polycarbonate resin (a2) | PC-1 | Synthesized compound | $6.4 \times 10^4$ | 25 | 25 | — | — | 32 | 42 | 25 | 25 | 25 | — | 2 | 25 |
| | | PC-2 | Synthesized compound | $6.8 \times 10^4$ | — | — | 20 | — | — | — | — | — | — | 30 | — | — |
| | | PC-3 | Synthesized compound | $8.0 \times 10^4$ | — | — | — | 12 | — | — | — | — | — | — | — | — |
| | Aromatic polycarbonate resin (other than a2) | PC-8 | K-4000 | $3.6 \times 10^4$ | — | — | — | — | — | — | — | — | — | — | — | — |
| | | PC-9 | E-2000 | $2.8 \times 10^4$ | — | — | — | — | — | — | — | — | — | — | — | — |
| | | PC-10 | M7027 | $2.7 \times 10^4$ | — | — | — | — | — | — | — | — | — | — | — | — |
| | | PC-11 | Synthesized compound | $1.0 \times 10^5$ | — | — | — | — | — | — | — | — | — | — | — | — |
| | Acrylic resin microparticles (B) | B1 | | | 1.0 | 4.0 | 1.0 | 1.0 | 1.0 | 1.0 | 1.0 | — | — | 1.0 | 1.0 | 1.0 |
| | | B2 | | | — | — | — | — | — | — | — | 1.0 | — | — | — | — |
| | | B3 | | | — | — | — | — | — | — | — | — | 1.0 | — | — | — |
| | Organic sulfonic acid metal salt (C) | | | | 0.09 | 0.09 | 0.09 | 0.09 | 0.1 | 0.1 | 0.1 | 0.1 | 0.1 | 0.08 | 0.1 | 0.08 |
| | Hollow glass beads (H) | | | | — | — | — | — | — | — | — | — | — | — | — | — |
| | Ultraviolet absorbent (D) | | | | 0.3 | 0.3 | 0.3 | 0.3 | 0.3 | 0.3 | 0.3 | 0.3 | 0.3 | 0.3 | 0.3 | 0.3 |
| | Phosphorus thermal stabilizing agent (E) | | | | 0.03 | 0.03 | 0.03 | 0.03 | 0.03 | 0.03 | 0.03 | 0.03 | 0.03 | 0.03 | 0.03 | 0.03 |
| | Mold release agent (F-2) | | | | 0.1 | 0.1 | 0.1 | 0.1 | 0.1 | 0.1 | 0.1 | 0.1 | 0.1 | 0.1 | 0.1 | 0.1 |
| | Mold release agent (F-2) | | | | 0.1 | 0.1 | 0.1 | 0.1 | 0.1 | 0.1 | 0.1 | 0.1 | 0.1 | 0.1 | 0.1 | 0.1 |
| | Silicone compound (G) | | | | — | — | — | — | — | — | 1 | — | — | — | — | — |
| Evaluation results | Fluidity (280° C.) | | $(\times 10^{-2}\ cm^3/sec)$ | | 7.8 | 8.0 | 7.8 | 8.4 | 5.2 | 3.6 | 8.7 | 7.8 | 7.9 | 7.5 | 8.1 | 7.6 |
| | Transmittance (%) | 1 mmt | | | 88 | 68 | 88 | 87 | 88 | 87 | 88 | 90 | 90 | 88 | 88 | 88 |
| | Degree of dispersion | 1 mmt | | | 22 | 49 | 23 | 22 | 23 | 22 | 22 | 7 | 4 | 23 | 22 | 23 |
| | Transmittance (%) | 2 mmt | | | 73 | 54 | 74 | 73 | 73 | 72 | 72 | 88 | 89 | 74 | 73 | 74 |
| | Degree of dispersion | 2 mmt | | | 35 | 58 | 36 | 35 | 36 | 35 | 35 | 18 | 11 | 35 | 36 | 36 |
| | Transmittance (%) | 3 mmt | | | 61 | 47 | 61 | 59 | 60 | 60 | 60 | 84 | 85 | 60 | 60 | 61 |
| | Degree of dispersion | 3 mmt | | | 39 | 59 | 39 | 40 | 39 | 39 | 40 | 24 | 16 | 39 | 39 | 39 |
| | Flame retardance 1.58 mmt | Number of drip | | | 0/10 | 0/10 | 0/10 | 0/10 | 0/10 | 0/10 | 0/10 | 0/10 | 0/10 | 0/10 | 0/10 | 0/10 |
| | | Number of surface ignition | | | 0/10 | 0/10 | 0/10 | 0/10 | 0/10 | 0/10 | 0/10 | 0/10 | 0/10 | 0/10 | 0/10 | 0/10 |
| | | TOTAL/MAX | | | 29/5 | 38/8 | 34/6 | 41/9 | 37/8 | 30/5 | 36/7 | 35/5 | 36/7 | 39/8 | 43/9 | 40/8 |
| | | UL94 | | | V-0 | V-0 | V-0 | V-0 | V-0 | V-0 | V-0 | V-0 | V-0 | V-0 | V-0 | V-0 |
| | Flame retardance 1.2 mmt | Number of drip | | | | | 1/10 | | 1/10 | | 0/10 | 2/10 | 2/10 | 0/10 | 3/10 | |
| | | Number of surface ignition | | | | | 0/10 | | 0/10 | | 0/10 | 1/10 | 2/10 | 0/10 | 3/10 | |
| | | TOTAL/MAX | | | | | 32/8 | | 24/6 | | 33/6 | 34/8 | 48/11 | 38/9 | 46/12 | |
| | | UL94 | | | | | V-0 | | V-0 | | V-0 | V-2 | V-2 | V-0 | V-2 | |
| | Thermal resistance 130° C., 500 hours | $\Delta YI$ | | | 0.83 | 0.92 | 0.80 | 0.98 | — | 0.89 | — | — | — | — | — | 0.71 |

TABLE 7

| | | | | | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|---|---|---|---|---|
| Formulation of resin composition (parts) | Aromatic polycarbonate resin (a1) | PC-4 | H-4000 | $1.6 \times 10^4$ | — | — | 70 | 40 | 22 | — | 72 | 70 | 70 |
| | | PC-5 | S-3000 | $2.1 \times 10^4$ | 100 | — | 5 | 8 | 8 | 20 | 8 | 5 | 5 |
| | | PC-6 | H-7000 | $1.3 \times 10^4$ | — | 69 | — | — | — | — | — | — | — |
| | | PC-7 | AL-071 | $5.0 \times 10^3$ | — | — | — | — | — | — | — | — | — |
| | Aromatic polycarbonate resin (a2) | PC-1 | Synthesized compound | $6.4 \times 10^4$ | — | 31 | 25 | — | — | — | — | 25 | 25 |
| | | PC-2 | Synthesized compound | $6.8 \times 10^4$ | — | — | — | — | — | — | — | — | — |
| | | PC-3 | Synthesized compound | $8.0 \times 10^4$ | — | — | — | — | — | — | — | — | — |
| | Aromatic Polycarbonate resin (other than a2) | PC-8 | K-4000 | $3.6 \times 10^4$ | — | — | — | 52 | — | — | — | — | — |
| | | PC-9 | E-2000 | $2.8 \times 10^4$ | — | — | — | — | 70 | — | — | — | — |
| | | PC-10 | M7027 | $2.7 \times 10^4$ | — | — | — | — | — | 80 | — | — | — |
| | | PC-11 | Synthesized compound | $1.0 \times 10^5$ | — | — | — | — | — | — | 20 | — | — |
| | Acrylic resin microparticles (B) | B1 | | | 1.0 | 1.0 | 1.0 | 1.0 | 1.0 | 1.0 | 1.0 | — | — |
| | | B2 | | | — | — | — | — | — | — | — | — | — |
| | | B3 | | | — | — | — | — | — | — | — | — | — |
| | Organic sulfonic acid metal salt (C) | | | | 0.1 | 0.1 | 0.12 | 0.1 | 0.1 | 0.1 | 0.1 | 0.1 | 0.09 |
| | Hollow glass beads (H) | | | | — | — | — | — | — | — | — | 5.0 | — |
| | Ultraviolet absorbent (D) | | | | 0.3 | 0.3 | 0.3 | 0.3 | 0.3 | 0.3 | 0.3 | 0.3 | 0.3 |
| | Phosphorus thermal stabilizing agent (E) | | | | 0.03 | 0.03 | 0.03 | 0.03 | 0.03 | 0.03 | 0.03 | 0.03 | 0.03 |
| | Mold release agent (F-2) | | | | 0.1 | 0.1 | 0.1 | 0.1 | 0.1 | 0.1 | 0.1 | 0.1 | 0.1 |
| | Mold release agent (F-2) | | | | 0.1 | 0.1 | 0.1 | 0.1 | 0.1 | 0.1 | 0.1 | 0.1 | 0.1 |
| | Silicone compound (G) | | | | — | — | — | — | — | — | — | — | — |
| 評価結果 | Fluidity (280° C.) | | $(\times 10^{-2}$ cm$^3$/sec) | | 8.0 | 11.2 | 8.5 | 5.8 | 5.3 | 4.0 | 3.7 | 8.3 | 7.6 |
| | Transmittance (%) | 1 mmt | | | 87 | 88 | 81 | 87 | 88 | 86 | 56 | 74 | 91 |
| | Degree of dispersion | 1 mmt | | | 22 | 23 | 23 | 21 | 22 | 21 | 25 | 17 | 2 |
| | Transmittance (%) | 2 mmt | | | 72 | 73 | 66 | 73 | 73 | 72 | 46 | 56 | 89 |
| | Degree of dispersion | 2 mmt | | | 35 | 36 | 36 | 35 | 34 | 34 | 37 | 25 | 2 |
| | Transmittance (%) | 3 mmt | | | 60 | 60 | 51 | 60 | 61 | 60 | 38 | 49 | 89 |
| | Degree of dispersion | 3 mmt | | | 38 | 39 | 39 | 39 | 38 | 39 | 40 | 24 | 2 |
| | Flame retardance 1.58 mmt | Number of drips | | | 2/10 | 4/10 | 0/10 | 5/10 | 5/10 | 1/10 | 0/10 | 5/10 | 0/10 |
| | | Number of surface ignition | | | 2/10 | 4/10 | 0/10 | 5/10 | 5/10 | 1/10 | 0/10 | 5/10 | 0/10 |
| | | TOTAL/MAX | | | 39/8 | 37/7 | 31/6 | 68/17 | 43/10 | 31/7 | 32/5 | 53/8 | 38/5 |
| | | UL94 | | | V-2 | V-2 | V-0 | V-2 | V-2 | V-2 | V-0 | V-2 | V-0 |
| | Flame retardance 1.2 mmt | Number of drips | | | | | | | | | 0/10 | | 0/10 |
| | | Number of surface ignition | | | | | | | | | 0/10 | | 0/10 |
| | | TOTAL/MAX | | | | | | | | | 37/5 | | 33/7 |
| | | UL94 | | | | | | | | | V-0 | | V-0 |
| | Thermal resistance 130° C., 500 hours | ΔYI | | | 0.54 | — | 1.2 | 0.88 | 0.85 | 7.6 | — | 2.4 | — |

Based on the results of Examples 14 to 25 given in Table 6 and the results of Comparative Examples 10 to 18 given in Table 7, the aromatic polycarbonate resin composition of the present invention containing a prescribed quantity of (meth) acrylic resin microparticles (microparticles (B)) in aromatic polycarbonate resin (A) exhibited both good total light transmittance and a good light-diffusing property, as well as good flame retardance and thermal resistance. Examples 14 to 20 and 23 to 25, into which were blended (meth)acrylic resin microparticles (microparticles (B)) of specified average particle diameter and specified particle diameter distribution, exhibited both good total light transmittance and a good light-diffusing property.

The molded articles of resin compositions other than the aromatic polycarbonate resin composition of the present invention that were obtained in Comparative Examples 10 to 15 exhibited poor flame retardance. The aromatic polycarbonate resin composition of Comparative Example 16 exhibited poor transparence, and so could be understood to have poor total light transmittance. The molded article of the melt method polycarbonate resin composition of Comparative Example 15 exhibited a markedly higher ΔYI value and poor thermal resistance. The material to which an excess quantity of organic sulfonic acid metal salt (C) was added in Comparative Example 12 and the composition containing a diffusing agent other than polyorganosilsesquioxane microparticles (microparticles (B)) in Comparative Example 17 both exhibited poor thermal resistance and high ΔYI values. Comparative Example 17, which contained a diffusing agent other than (meth)acrylic resin microparticles (microparticles (B)), exhibited a poor balance between total light transmittance and light-diffusing property, and was found not to have exhibited an enhanced flame retardance effect. Comparative Example 18, which did not contain (meth) acrylic resin microparticles (B), was found to exhibit a low degree of dispersion and no diffusing property.

The aromatic polycarbonate resin composition of the present invention provides a molding material exhibiting good total light transmittance, a good light-diffusing property, a good degree of dispersion, and being excellent in moldability, flame retardance, and thermal resistance. Thus, the aromatic polycarbonate resin composition of the present invention can be employed in a wide range of fields, such as lighting covers, illuminated signs, light-passing screens, various displays, and the light-diffusing sheets and light-diffusing plates of liquid-crystal display devices. The industrial applicability of the present invention is extremely broad.

All documents described in the specification are expressly incorporated herein by reference in their entirety.

The invention claimed is:

1. An aromatic polycarbonate resin composition, which comprises:
   per 100 mass parts of an aromatic polycarbonate resin (A) comprising an aromatic polycarbonate resin (a1) with a viscosity average molecular weight of $3\times10^3$ to $2.5\times10^4$ and an aromatic polycarbonate resin (a2) with a viscosity average molecular weight of $5\times10^4$ to $9\times10^4$ in a ratio such that, when a total quantity of aromatic polycarbonate resins (a1) and (a2) is denoted as 100 mass percent, (a1):(a2)=99 mass percent to 50 mass percent:1 mass percent to 50 mass percent;
   0.01 to 10 mass parts of microparticles (B) selected from the group consisting of polyorganosilsesquioxane microparticles and (meth)acrylic resin microparticles; and
   0.005 mass part to 0.1 mass part of a flame retardant (C) in the form of organic sulfonic acid metal salt;
   wherein a molten resin quantity Q value flowing out of an orifice 1 mm in diameter×10 mm in length at a temperature of 280° C. at a load of $1.57\times10^7$ Pa using a constant-load orifice-type flow tester is equal to or greater than 0.01 cm$^3$/second and equal to or lower than 0.1 cm$^3$/second.

2. The aromatic polycarbonate resin composition according to claim 1, wherein the viscosity average molecular weight of aromatic polycarbonate resin (a2) is $5\times10^4$ to $8\times10^4$.

3. The aromatic polycarbonate resin composition according to claim 1, which comprises 0.01 to 5 mass parts of polyorganosilsesquioxane microparticles per 100 mass parts of aromatic polycarbonate resin (A).

4. The aromatic polycarbonate resin composition according to claim 1, wherein microparticles (B) are polyorganosilsesquioxane microparticles the average particle diameter of which as measured over a range of 0.4 to 12 μm by Coulter counter method is 1 to 3 μm, with the highest peak and second highest peak in a particle diameter distribution of the polyorganosilsesquioxane microparticles both lying within a range of 1 to 3 μm.

5. The aromatic polycarbonate resin composition according to claim 1, wherein microparticles (B) are polyorganosilsesquioxane microparticles with a number based frequency (%) of 0.1 to 8% over the range of 0.5 to 1 μm when measuring the number based frequency (%) over a diameter range of 0.4 to 12 μm by Coulter counter method, and with a volume based frequency (%) of 0.05 to 2.5% over the range of 4 to 11 μm.

6. The aromatic polycarbonate resin composition according to claim 1, wherein microparticles (B) are polyorganosilsesquioxane microparticles in the form of polymethylsilsesquioxane microparticles.

7. The aromatic polycarbonate resin composition according to claim 1, which comprises 0.1 to 10 mass parts of (meth)acrylic resin microparticles per 100 mass parts of aromatic polycarbonate resin (A).

8. The aromatic polycarbonate resin composition according to claim 1, wherein microparticles (B) are (meth)acrylic resin microparticles the particle diameter of which as measured on a number basis over a diameter range of 0.4 to 12 μm by Coulter counter method satisfies conditions (i) to (iii) below:
   (i) an average particle diameter of 1 to 4 μm;
   (ii) a ratio of particles with a particle diameter of equal to or greater than 1 μm but less than 2 μm, a ratio of particles with a particle diameter of equal to or greater than 2 μm but less than 3 μm, and a ratio of particles with a particle diameter of equal to or greater than 3 μm each falling within a range of 20 to 40%; and
   (iii) essentially not comprising particles with a particle diameter of equal to or greater than 10 μm.

9. The aromatic polycarbonate resin composition according to claim 1, wherein microparticles (B) are (meth)acrylic resin microparticles in the form of copolymer microparticles comprising 90 to 99 mass percent of a noncrosslinking (meth) acryl monomer (b1) and 10 to 1 mass percent of a crosslinking monomer (b2).

10. The aromatic polycarbonate resin composition according to claim 1, wherein microparticles (B) are (meth)acrylic resin microparticles in the form of polymethyl methacrylate microparticles.

11. The aromatic polycarbonate resin composition according to claim 1, which further comprises 0.05 to 1 mass part of an ultraviolet absorbent (D) per 100 mass parts of aromatic polycarbonate resin (A).

12. An aromatic polycarbonate resin molded article obtained by molding the aromatic polycarbonate resin composition according to claim 1.

13. The molded article according to claim 12, which is a lighting cover or a light-diffusing plate.

* * * * *